United States Patent [19]

Skiff

[11] 4,092,296

[45] May 30, 1978

[54] EPOXY RESIN COMPOSITIONS

[76] Inventor: Russell A. Skiff, 7449 Avenue 304, Visalia, Calif. 93277

[21] Appl. No.: 387,758

[22] Filed: Aug. 13, 1973

[51] Int. Cl.² .................. C08L 63/00; C08G 59/68
[52] U.S. Cl. .................. 260/47 EP; 260/2 EP; 260/2 EC; 260/2.5 EP; 260/29.2 EP; 260/47 EC; 260/47 EQ; 260/59 EP; 260/830 TW
[58] Field of Search .......... 260/2 EC, 47 EC, 47 EQ, 260/47 A, 59 EP, 29.2 EP, 18 PF, 2.5 EP, 51 EP

[56] References Cited

U.S. PATENT DOCUMENTS

| 3,004,931 | 10/1961 | Brueschweiler et al. | 260/47 X |
| 3,379,653 | 4/1968 | Pfeffingen et al. | 260/2 |
| 3,432,440 | 3/1969 | Shimp et al. | 260/2 X |

FOREIGN PATENT DOCUMENTS 766,273  1/1957  United Kingdom ............ 260/47

Primary Examiner—Theodore E. Pertilla
Attorney, Agent, or Firm—Edgar W. Averill, Jr.

[57] ABSTRACT

Curable epoxy resin compositions are disclosed comprising an epoxy resin based on epichlorohydrin and a dihydric phenol having combined therewith a metallic fluoborate salt, said composition being free from a strong acid or the hydrolyzable ester thereof. Fluoborate salts in aqueous solution are used as a curing agent and these salts are shown in combination with a surfactant or a polyalcohol. The resulting epoxy resin composition may be made autocatalytic. Epoxy foam formulations and fire retardant epoxy formulations are described. Fluoborate salts set forth include the salts of tin, copper, zinc, nickel, lead and silver. The use of adducted combinations of these salts is also shown.

25 Claims, No Drawings

EPOXY RESIN COMPOSITIONS

BACKGROUND OF THE INVENTION

The conversion of a liquid or thermoplastic uncured epoxy to a tough thermoset solid epoxy may be brought about by the addition of a wide range of curing agents (also known as hardeners, activators or catalysts). These curing agents differ widely in their effect upon the uncured resin, for example, the curing action may be exothermic with some curing agents while requiring the application of external heat with others. Furthermore, the curing epoxy group may react anionically or cationically. Since there are over 50 different epoxy resins available, and hundreds of known curing agents, the epoxy formulator has available to him a very wide diversity of resin curing agent combinations.

While basic curing agents such as Lewis bases, inorganic bases, primary and secondary amines and amides are most commonly used curing agents, acid curing agents are preferred in many formulations. Of these acid curing agents, carboxylic acid, anhydrides, dibasic organic acids, phenols and Lewis acids are types of curing agents which can be made to successfully bring about the curing reaction. By the term "Lewis acids" is meant those compounds containing empty orbital positions in the outer shell of one of the atoms and because of this, there acids are attracted to areas of increased electron density.

Of the Lewis acids, boron trifluoride and amine complexes thereof are useful curing agents (see Lee & Neville, *Handbook of Epoxy Resins*, McGraw Hill 1967 at pp. 5-13 through 5-16). These catalysts, while effective curing agents, have the disadvantage of being hard to control and often lead to rapid reaction rates with an undesirably high exotherm which can cause thermal degradation of the polymer with its concomitant darkening or gas evolution.

Several approaches have been proposed to help control the rapid exotherm. One such approach is disclosed in U.S. Pat. No. 3,117,099 which suggests a mixture of boron trifluoride and stannous compounds of the general formula: $Sn(OR)_2$ in which R is a monovalent hydrocarbon radical, saturated or unsaturated, branched chain or straight chain, containing 1 to 18 carbon atoms, preferably 3 to 12. The use of this curing system is, however, limited to epoxide compositions whih contain either a cyclohexene oxide or a cyclopentene group and, thus, is not available for the wide variety of epoxides which do not contain these groups.

Another patent disclosing boron trifluoride ($BF_3$) addition products is U.S. Pat. No. 2,824,083 which suggests products of $BF_3$ and an amine, amide, phenol or ether dissolved in a liquid polyol and preferably a liquid polyalkylene glycol having a molecular weight above 100. These curing systems are limited in use, however, because most require that the formulation be heated to a high temperature, e.g. 212° F to 392° F, to give a good rate of cure. Another patent disclosing amine-boron trifluoride complexes is U.S. Pat. No. 2,717,885. The curing agents there described remain unreactive at room temperature and must be heated to an elevated temperature to cure (most examples of this patent used 392° F with the lowest curing temperature used being 266° F).

U.S. Pat. No. 3,432,440 suggests various fluoborate salts in combination with an acid or hydrolyzable ester thereof. Examples suggested in this patent include $Zn(BF_4)_2$, $Ni(BF_4)_2$, $Cu(BF_4)_2$, $Sn(BF_4)_2$. $Zn(BF_4)_2$ and $Ni(BF_4)_2$. The patent states that activation of the fluoborate salt by a relatively strong acid is essential and that the release of $HBF_4$ may be delayed by providing a hydrolyzable ester of the strong acid rather than the strong acid itself. Examples of such hydrolyzable esters include triphenyl, phosphite, diphenyl phosphite, dimethyl hydrogen phosphite, n-butyl acid phosphate, diethyl oxalate, triethyl phosphite and dimethyl sulfate.

U.S. Pat. No. 2,970,983 includes the use of $BF_3$ complexes as a suggested curing agent. Such complexes are not listed among the "preferred curing agents" of this patent.

Many polyepoxides exhibit an excellent ability to bond to a wide range of substrates, however, a still further improvement is often desired. U.S. Pat. No. 3,014,893 discloses that the addition of an inorganic amphoteric oxide to an epoxy resin will significantly improve the adhesive bond strength of the cured epoxy as compared to a conventionally cured epoxy lacking the inorganic amphoteric oxide. Oxides of phosphorous, arsenic, antimony, bismuth, tin, lead, and germanium are suggested.

The amphoteric oxides may be used alone or in conjunction with a conventional organic amine or organic anhydride curing agent. In order to effect cure, heating is necessary and temperatures of 500 to 600° F are recommended.

Although epoxy resins are not exceptionally flammable, they, like most plastics, when exposed to flame will ignite and burn. Various means are known to decrease the flammability of burning rate of epoxy resins. Novolac based epoxy resins may be based on chlorinated phenols to impart flame resistance to the cured compositions. Chlorine in various forms is used in other epoxy resins to impart flame resistance but often has a tendency to lower thermal stability particularly in the case of amine cures since heat aging may cause the evolution of hydrochloric acid. Brominated resins are also used where flame resistance is needed but such resins are relatively unstable above 392° F.

For some applications decreased density, decreased cost or increased insulation properties is needed and thus the foaming of epoxy resins is suggested. Epoxy foams are characterized by good adhesive strengths, low water absorption, good dimensional stability, good heat resistance and generally good resistance to chemical attack. Such foams have found use as lightweight potting compounds for electronic equipment and for laod bearing sections of honeycomb members. They have also found use as thermal insulators. Two basic types of epoxy foam formulations are in wide use, namely, chemical foams and syntactic foams. Chemical foams are produced by the release of a gas through a chemical reaction or vaporization whereas syntactic foams are obtained by the incorporation of a prefoamed or low density filler. Epoxy foams have not found a broad based acceptance, however, due in part to the high cost of forming most foams.

Because of its low cost and excellent combination of properties, epoxy resins based upon epichlorohydrin and bisphenol-A are preferred for a wide variety of applications. A curing system which will be effective to give a controlled desirable amount of exotherm without the necessity of the addition of external heat to initiate reaction and which is effective for a wide variety of epoxy resins including those made from epichlorohydrin and bisphenol-A is needed. The utilization of such a curing system to help give specialized properties such as improved adhesion, flame retardancy or foamability is highly desirable.

SUMMARY OF THE INVENTION

A wide range of epoxy resins may be cured with a series of metallic fluoborates such as copper fluoborate [$Cu(BF_4)_2$], nickel fluoborate [$Ni(BF_4)_2$], zinc fluoborate [$Zn(BF_4)_2$], lead fluoborate [$Pb(BF_4)_2$], silver fluoborate [$Ag\ BF_4$] and stannous fluoborate [$Sn\ (BF_4)_2$]. The cure may be carried out at elevated or room temperature and tends to be autocatalytic and exothermic. The exotherm is controllable and may, advantageously, be used to activate one or more blowing agents to form an epoxy foam as shown in several of the examples which follow. The curing agents of the present invention may be used in conjunction with surface acting agents to create water-control capability and may further be used with epoxy resins which have been emulsified to a low solids content for use in coatings and other applications where low viscosity is useful. The curing agent may further be used in conjunction with ceramic type fillers such as metallic oxides, e.g. aluminum oxide silicon dioxide, antimony oxide or boron oxide. The exotherm can be controlled such that when combined with a blowing agent such as trichlorofluoromethane, a low pressure foam results. Furthermore, chemically reactive foaming agents such as aluminum powder, magnesium hydroxide and calcium carbonate are particularly suitable with the curing agents of the present invention.

DESCRIPTION OF THE PREFERRED EMBODIMENTS

The curing agents of the present invention are useful in a wide range of epoxy resins or epoxides, these two terms being used interchangeably herein. By "epoxy resin" it is intended to include any molecule containing more than one alpha epoxy group whether situated internally, terminally or on cyclic structures, capable of being converted to a useful thermoset form. The term is used to indicate resins in both the uncured and cured states.

Because of their wide availability and low cost, the most expansive experimentation has been carried out on epoxy resins formed by the reaction of epihalohydrins with polyhydric organic compounds. Of these, one specific example is the product of reaction between epichlorohydrin and bisphenol-A [Bis-(hydroxyphenyl) dimethylmethane]. Methods for the preparation of epoxy resins are described in U.S. Pat. No. 2,444,333 and 2,324,483 and are well known to those skilled in the art. While the bisphenols are the preferred polyhydric compounds, other polyhydric compounds, particularly polyhydric alcohols such as ethylene glycol or glycerin can be used to produce the epoxy resins which are particularly useful in accordance with the present invention.

This invention will be described by the use of numerous examples which are presented to illustrate the use of the curing systems of the invention. The examples have been selected to illustrate particular, typical and preferred embodiments of the invention but many departures and modifications thereof will suggest themselves to one skilled in the art and the invention is, therefore, not to be limited except as recited in the appended claims.

The first group of examples were carried out to illustrate the use of tin fluoborate with a bisphenol-A epichlorohydrin resin having an epoxide equivalent between 185 and 200 and sold under the trademark Epirez 510. Increasing levels of a 50% aqueous solution of stannous fluoborate $Sn(BF_4)_2$ were used. Unless otherwise stated, all examples were hand mixed and the curing agent solution was added to 100 grams of resins. The mixtues are stirred to assure a uniform dispersion or solution. All solutions of the fluoborate salts are aqueous solutions unless otherwise stated but the invention is not limited to agueous solutions.

| Example | Epirez 510 gms | Tin Fluoborate 50% Sol., gms | Pot Life 70° F min | 5 g Gel Time at 120° F min |
|---|---|---|---|---|
| 1 | 100 | 1 | 2 | 2 |
| 2 | 100 | 2 | 2 | 2 |
| 3 | 100 | 4 | 1.5 | 1.5 |
| 4 | 100 | 6 | 1 | 1 |
| 5 | 100 | 15 | 1 | 1 |

During the mixing of the ingredients of Example 1, an exothermic reaction took place and the viscosity dropped with increasing temperature. The mixture gelled in about 2 minutes and cured to a hard, solid resin having a slightly darker color than the liquid resin. An oven-cured sample held at 120° F for 10 minutes cured to a very hard and tough resin.

Example 2 and 3 exhibited the same characteristics as Example 1 except that Example 3 developed a noticeably higher exotherm and the cured sample was significantly darker in color. Example 4 developed a very high exotherm causing the curing sample to smoke and completely discolor, however, an oven cured sample was very hard and tough.

The resin-curing agent mixture of Example 5 exhibited some incompatibility when first mixed but turned to a cream-like mixture prior to exotherm. It cured with a very high exotherm which caused the resin to foam and emit a substantial quantity of smoke.

Examples 1 through 5 demonstrate that a 50% aqueous solution of tin fluoborate is capable of curing a bisphenol-A epichlorohydrin diepoxide resin having an epoxide equivalent of about 200. Levels of one half part of stannous fluoborate to 100 parts by weight of resin brought about a rapid room temperature cure and it was only when the amount of tin fluoborate exceeded about 3 parts by weight per 100 parts by weight of resin that the room temperature cure led to an exotherm sufficient to completely discolor the resin. Levels of stannous fluoborate greater than 3 parts by weight can nonetheless be useful with this resin when the ambient temperature of the resin is low and the mass of resin cured is small.

Examples 6 through 11 were carried out on an aliphatic diepoxide resin having an epoxide equivalent between about 300 and 325 sold under the trademark Epirez 502. This resin is commonly used to impart flexibility, or to give improved impact resistance or thermal shock resistance.

| Example | Epirez 502 gms | $Sn(BF_4)_2$ 50% sol. gms | Pot LIfe at 70°F min | 5 g. gel time at 120° F |
|---|---|---|---|---|
| 6 | 100 | 1 | 5 | 4 |
| 7 | 100 | 2 | 4 | 3 |
| 8 | 100 | 4 | 2 | none |
| 9 | 100 | 6 | 1 | none |
| 10 | 100 | 15 | — | — |

-continued

| Example | Epirez 502 gms | Sn(BF$_4$)$_2$ 50% sol. gms | Pot LIfe at 70°F min | 5 g. gel time at 120° F |
|---|---|---|---|---|
| 11 | 100 | 30 | — | — |

The mixing procedure for all examples is as described above for example 1. Example 6 exhibited a definite exothermic reaction giving off a slight amount of vapor. The sample showed very little discoloration and cured to a flexible polymer. An oven sample cured at 120° F cured to a flexible, tough polymer.

Example 7 exhibited a higher exotherm, more vapor and discoloration. Surprisingly, the sample cured to a very flexible gelly-like consistency and was softer and appeared to be less cured than the polymer of Example 6.

The resin formulation of Example 8 exhibited a very high exotherm after about 2 minutes and darkened in color but the sample remained liquid. Similarly, the resin formulation of Example 9 exhibited a high exotherm but changed in color less than Example 8 and also remained in a liquid state with a lower viscosity than the resin of Example 8. These liquids were used as curing agents in some of the examples below (e.g. Examples 37 to 48).

The resins of Examples 10 and 11 exhibited an immediate exothermic reaction and became foamy in consistency but, nonetheless, remained liquid. No noticeable color change was apparent and, it is believed that a reaction between the resin and tin fluoborate occurred resulting in an adduct. This mixture or adduct was used as a hardener in later reactions (e.g. Examples 49 to 54).

Examples 12 through 20 were carried out using a bisphenol-A epichlorohydrin diepoxide resin containing a surfactant to enable dispersing it in an aqueous media and sold under the trademark Epirez WD-510. This resin has an epoxide equivalent of 200.

| Example | Epirez WD-510 gms | Tin Fluoborate 50% sol. gms | Pot Life at 70° F min | 5 gm. gel time at 120° F min. |
|---|---|---|---|---|
| 12 | 100 | 1 | 17 | 14 |
| 13 | 100 | 2 | 8 | 6 |
| 14 | 100 | 4 | 5 | 4 |
| 15 | 100 | 6 | 4 | 3 |
| 16 | 100 | 15 | 1.5 | — |
| 17 | 100 | 30 | 1.5 | — |
| 18 | 100 | 50 | 1 | — |
| 19 | 100 | 100 | — | — |
| 20 | 100 | 125 | — | — |

The mixture of Example 12 had a pot life of 17 minutes at room temperature and a viscosity similar to that of cream. It exhibited very little exotherm but the cured sample was slightly discolored and was hard and tough.

The mixture of Example 13 had a shorter pot life and exhibited an unusual and unexpected practically instant gellation to a hard, tough polymer. A high exotherm was evident.

Example 14 exhibited the same unusual rapid gellation giving a hard tough polymer with a high exotherm and exhibited more discoloration than did the resin of Example 13. Example 15 showed the same rapid gellation but further exotherm and discoloration including excessive smoking during the exotherm.

The resin of Example 16 which had 15 grams of the tin fluoborate solution exhibited some incompatibility upon initial blending but, nonetheless, blended well. A fast reaction was observed and the resulting exotherm was not excessive. The cured polymer was closed cell foam.

The resin and curing agent solutions of Examples 17 and 18 were difficult to blend requiring about 1 minute of mixing time to complete. Both mixtures resulted in an exothermic reaction and developed a fast reacting polymer foam.

Example 19, utilizing equal weights of resin and catalyst solution produced a creamy mixture with some exotherm after the time 75 grams of catalyst had been added. When the balance of the catalyst was added, a foam was produced with a slower reaction and of smaller volume than the foam of Example 18. Similarly, the mixture of Example 20 exhibited an exothermic reaction with some foaming occuring but less than that of Example 19. The polymer of Example 19 was a semi-hard material.

The following Examples were run with an aliphatic trifunctional epoxide resin having very high reactivity sold under the trademark Epirez 5044 and having an epoxide equivalent of from 150 to 170.

| Example | Epirez 5044, gms | Tin fluoborate 50% sol., gms | Pot Life at 70° F, sec. | 5 gm. gel time at 120° F min |
|---|---|---|---|---|
| 21 | 100 | 1 | 35 | — |
| 22 | 100 | 2 | 25 | — |

Both examples exhibited extremely fast reaction rates resulting in incomplete mixing, high exotherm and a substantial amount of smoke and discoloration. Note that the pot life is expressed in seconds rather than minutes for these two examples.

The following examples used an epoxy novolac resin based on an unsubstituted phenol formaldehyde resin having high reactivity and an epoxide equivalent between 175 and 185 and sold under the trademark Epirez 5155. Because of the high viscosity of this resin, it was heated to 120° F in order to lower its viscosity and facilitate mixing. The pot life is expressed in seconds rather than minutes and was measured at 120° F rather than 70° F as in the preceding examples.

| Example | Epirez 5155, gms | In Fluoborate 50% Sol, gms | Pot Life at 120° F, sec |
|---|---|---|---|
| 23 | 100 | 1 | 30 |
| 24 | 100 | 2 | 23 |
| 25 | 100 | 4 | 19 |

The mixtures of Examples 23 and 24 exhibited a very fast reaction with a surprisingly low exotherm. Both mixtures cured to a hard, tough solid. The mixture of Example 25 also exhibited a very fast reaction but, unlike Examples 23 and 24, exhibited a very high exothermic condition resulting in smoke and discoloration of the resulting polymer.

A series of polymers were made using a bisphenol-A epichlorohydrin diepoxide resin modified with butyl glycidyl ether, having an epoxide equivalent of from 180 to 195 and sold under the trademark Epirez 5071.

| Example | Epirez 5071, gms | Tin Fluoborate 50% Sol., gms | Pot Life at 70° F, sec. |
|---|---|---|---|
| 26 | 100 | 1 | 90 |
| 27 | 100 | 2 | 78 |
| 28 | 100 | 4 | 70 |

-continued

| Example | Epirez 5071, gms | Tin Fluoborate 50% Sol., gms | Pot Life at 70° F, sec. |
|---|---|---|---|
| 29 | 100 | 15 | 120 |
| 30 | 100 | 30 | 120 |
| 31 | 100 | 50 | 90 |

The mixtures of Examples 26 and 27 exhibited a high exothermic reaction with an unusually fast gellation time. The resins cured with some discoloration and fumes.

The mixture of Example 28 had a very high exotherm and fast gellation time. The resin completely discolored and smoked during cure.

The still higher catalyst levels used in Examples 29–31 cured to a foamed polymer which was hard and tough although discolored. All three mixtures blended easily to a cream-like consistency and exhibited a high exotherm prior to foaming.

The next series of Examples were run with an aliphatic polyglycidyl ether having good low temperature reactivity, low viscosity and the ability to impart flexibility when used as a modifier for other resins. This resin is sold under the trademark Epirez 5042. The results were as follows:

| Example | Epirez 5042, gms | Tin Fluoborate 50% Sol., gms | Pot Life at 70° F, sec. |
|---|---|---|---|
| 32 | 100 | 1 | 30 |
| 33 | 100 | 2 | 25 |
| 34 | 100 | 15 | — |
| 35 | 100 | 30 | — |
| 36 | 100 | 50 | — |

The mixture of Example 32 exhibited a mild exothermic reaction with a little vapor given off during exotherm and the polymer was slightly discolored and flexible. The mixture of Example 33 exhibited an initial mild exothermic reaction with some vapor during initial gellation. This first reaction was followed by a secondary very high exothermic reaction with smoking and charring of the sample.

After about 10 seconds mixing, the mixture of Example 34 exhibited a high exothermic reaction emitting smoke. The resin cured to a discolored polymer foam with a charred appearance.

A very fast reaction was noted during the mixing of Example 35 and, like 34, it emitted smoke and cured to a charred discolored polymer foam. The mixture of Example 36 resulted in essentially the same reaction and cured product as that of Example 35.

A series of experiments were run on the bisphenol-A epichlorohydrin diepoxide resin sold under the trademark Epirez 510 utilizing what is believed to be an adduct formed by the mixing of a metallic fluoborate and an epoxy resin. Specifically, the mixture of Example 8 was used which contained 100 grams of the aliphatic diepoxide resin having an epoxide equivalent from 300 to 325 and sold under the trademark Epirez 502 which was reacted with 4 grams of a 50% aqueous solution in tin fluoborate. This mixture, although exhibiting a high exotherm, remained liquid and is referred to below as "adduct Ex. 8". It should be noted that while this product is referred to as an "adduct" the extent of chemical and/or physical bonding between the resin and catalyst is unknown and a determination of the exact nature of the bonding of this is unnecessary for the practice of the present invention.

| Example | Epirez 510 gms | Adduct Ex. 8 gms | Pot Life at 70° F, min. | 5 gm. gel time at 120° F, min. |
|---|---|---|---|---|
| 37 | 100 | 2 | — | — |
| 38 | 100 | 10 | 18 | 11 |
| 39 | 100 | 20 | 22 | 12 |

The mixture of Example 37 increased in viscosity upon mixing but exhibited no apparent exotherm. The sample had not gelled after 118 hours at 120° F.

The mixture of Example 38 was easy to blend and reacted with a moderate exotherm and cured to a hard, tough polymer with no discoloration. As shown in Example 39, the use of 20 grams of "adduct Ex. 8" gave a longer pot life than did the use of 10 gms. in Example 38. The mixture of Example 39 cured to a hard, tough polymer with no discoloration after going through a moderate exotherm. Blending of this mixture was particularly easy.

The same resin as that used in Examples 37 through 39 was cured with the reaction product of Example 9 ("adduct Ex. 9"). This adduct is a liquid with a lower viscosity than the adduct of Example 8 and has a somewhat lighter color.

| Example | Epirez 510 gms | Adduct Ex. 9 gms | Pot Life at 70° F, min. | 5 gm. gel time at 120° F, min. |
|---|---|---|---|---|
| 40 | 100 | 2 | — | — |
| 41 | 100 | 10 | 13 | 10 |
| 42 | 100 | 20 | 15 | 11 |

The level of "adduct Ex. 9" added in Example 40 was not sufficient to result in any apparent exotherm but a gradual increase in viscosity during mixing was noticed. A sample held at 120° F had not gelled after 115 hours.

The mixture of Example 41 was easy to blend and reacted with a slight exotherm and had some air entrapment at gellation. The sample held at 70° F cured to a hard, tough polymer as did that held at 120° F.

The mixture of Example 42 reacted similarly to that of Example 41 except that a higher exotherm was observed. Although the pot life and gel time was similar, it was slightly longer than that exhibited by Example 41.

"Adduct Ex. 8" was used as a curing agent for the bisphenol-A epichlorohydrin diepoxide resin containing a surfactant to enable dispersing in aqueous media sold under the trademark Epirez WD-510.

| Example | Epirez WD-510, gms | Addduct Ex. 8 gms | Pot Life at 70° F, min. | 5 gm. gel time at 120° F, min. |
|---|---|---|---|---|
| 43 | 100 | 2 | — | — |
| 44 | 100 | 10 | 44 | 24 |
| 45 | 100 | 20 | 23 | 16 |

The three mixtures were easy to blend but the mixture of Rxample 43 had not gelled after 117 hours and exhibited no apparent exotherm during mixing although an increase in viscosity was noted. The mixture of Example 44 had a low exotherm and remained flexible after 117 hours at 70° F. The sample held at 120° F also remained flexible. The mixture of Example 45 exhibited a moderate exotherm and cured to a hard, tough polymer.

This same resin was cured with the above-described "adduct Ex. 9" as shown in Examples 46 through 48.

| Example | Epirez WD-510, gms | Adduct Ex. 9 gms | Pot Life at 70° F, min. | 5 gm. gel time at 120° F, min. |
|---|---|---|---|---|
| 46 | 100 | 2 | — | — |
| 47 | 100 | 10 | 26 | 12 |
| 48 | 100 | 20 | 19 | 11 |

All mixtures were easy to blend but that of Example 46 exhibited only a rise in viscosity with no exotherm or gellation. The mixtures of Examples 47 and 48 exhibited some exotherm and cured to hard, tough polymers with the exotherm of Example 48 being slightly higher than that of Example 47.

The reaction product of the mixture of Example 10 (referred to as "adduct Ex. 10"), although reacting exothermically, did not darken in color to a noticeable extent during its reaction. It was used as the curing agent for the following three examples in combination with epoxy resin described above and sold under the trademark Epirez WD-510.

| Example | Epirez WD-510, gms | Adduct Ex. 10 gms | Pot Life at 70° F, min. | 5 gm. gel time at 120° F, min. |
|---|---|---|---|---|
| 49 | 100 | 2 | 37 | 20 |
| 50 | 100 | 10 | 8 | 7 |
| 51 | 100 | 20 | 7 | 6 |

The mixture of Example 49 remained in a soft, incompletely cured state after 113 hours at 120° F although it exhibited a slight exotherm together with a rapid rise in viscosity. The mixtures of Examples 50 and 51 blended easily with a slow rise in viscosity, moderate exotherm and almost instantaneous gellation at exotherm. Both mixtures cured to very hard tough polymers. The exotherm of the mixture of Example 51 was higher than that of Example 50.

The resin used in Examples 43–51 was cured with the reaction mixture of Example 11 which is referred to as "adduct Ex. 11".

| Example | Epirez WD-510, gms. | Adduct Ex. 11 gms. | Pot Life at 70° F, min. | 5 gm. gel time at 120° F, min. |
|---|---|---|---|---|
| 52 | 100 | 2 | 16 | 13 |
| 53 | 100 | 10 | 7 | 11 |
| 54 | 100 | 20 | 5 | 6 |

The mixture of Example 52 reacted with a mild exotherm and cured to a flexible polymer. The mixture of Example 53 showed a high exothermic reaction and cured to a very tough polymer with no discoloration. A sample, oven-cured, at 120° F was also hard and very tough.

The mixture of Example 54 had a very high exothermic reaction followed by almost instantaneous gellation and additional exothermic heat and discoloration. The mixture cured to a hard, tough polymer.

A wide rage of resins was cured with a 40% aqueous solution of cupric fluoborate [Cu(BF$_4$)$_2$]. This salt is available commercially in 40% solution and is used for copper plating baths. A series of seven mixtures were made using this solution and the above-described resin sold under the trademark Epirez 510. The results were as follows:

| Example | Epirez 510 gms. | Cupric Fluoborate 40% Sol., gms. | Pot Life at 70° F, min. | 5 gm. gel time at 120° F, min. |
|---|---|---|---|---|
| 55 | 100 | 1 | 45 | 38 |
| 56 | 100 | 2 | 22 | 29 |
| 57 | 100 | 4 | 16 | 23 |
| 58 | 100 | 6 | 10 | 16 |
| 59 | 100 | 15 | 10 | 6 |
| 60 | 100 | 30 | 7 | 6 |
| 61 | 100 | 50 | 6 | 4 |

After mixing, the viscosity of the mixture of Example 55 dropped sharply and an exothermic reaction occurred. At 120° F the mixture gelled in 38 minutes and cured to a hard, solid with a slightly darker color than the uncured resin.

The mixture of Example 56 also exhibited a viscosity drop and had a high exothermic condition gelling in 22 minutes at 70° F. Some smoking and discoloration took place but the oven-cured sample held at 120° F was very hard and tough.

The mixture of Example 57 exhibited considerable smoking and discoloration after it had gelled and, as above, the oven-cured sample (that held at 120° F) was very hard and tough. The mixture of Example 58 reacted in the same manner as that of Example 57 with more smoke being generated and complete sample discoloration although, once again, the oven-cured sample was very hard and tough.

The still higher level of copper fluoborate solution used in Example 59 gave a pot life of 10 minutes, a high exotherm and produced a slow foaming reaction curing to a hard, tough foam. Samples held at 70° F and 120° F cured to the same foamed resin.

The 30 gram level of Example 60 resulted in a mixture which was very easy to blend and had a low exotherm with foaming occurring during gellation. The cured foam was hard and tough. Examples 61 mixed to a semi-thixotropic consistency with moderate exothermic heat and foaming during gellation. The cured foam was, once again, hard and tough.

The same cupric fluoborate solution was utilized to bring about the cure of the above-described resin sold under the trademark Epirez 502. Levels between 1 and 30 grams of this solution were added.

| Example | Epirez 502 gms. | Cupric Fluoborate 40% sol., gms. | Pot Life at 70° F, min. | 5 gm. gel time at 120° F min. |
|---|---|---|---|---|
| 62 | 100 | 1 | — | 240–360 |
| 63 | 100 | 2 | 120–240 | 20 |
| 64 | 100 | 4 | 90 | 22 |
| 65 | 100 | 6 | 90 | — |
| 66 | 100 | 15 | — | — |
| 67 | 100 | 30 | — | — |

The mixture of Example 62 had a pot life in excess of 96 hours but a 5 gram mass gelled in between 4 to 6 hours giving a flexible polymer. Very little exotherm was apparent.

The mixture of Example 63, although having a 2 to 4 hour pot life, reacted with a high exotherm and cured to a flexible polymer very dark in color. The mixture of Example 64 reacted with a high exotherm and cured to a sticky gelly-like consistency which was badly discolored.

A high viscosity liquid was the end product of the mixture of Example 65. Although exhibiting a very high exotherm, the end product was considerably lighter in color than that of Examples 63 and 64 but slightly darker in color than the original mixture. The mixtures of Examples 66 and 67 exhibited only a slight increase in viscosity and, after 96 hours, their viscosities appeared to stabilize and the mixtures were pourable liquids.

The following eight examples were run using the above-described resin sold under the trademark Epirez WD-510 and the above-described 40% aqueous solution of cupric fluoborate.

| Example | Epirez WD-510 gms. | Cupric Fluoborate 40% sol., gms. | Pot Life at 70° F, min. | 5 gm. gel time at 120° F, min. |
| --- | --- | --- | --- | --- |
| 68 | 100 | 1 | 3360 | 105 |
| 69 | 100 | 2 | 480 | 57 |
| 70 | 100 | 4 | 360 | 30 |
| 71 | 100 | 6 | 360 | 25 |
| 72 | 100 | 15 | 25 | 13 |
| 73 | 100 | 30 | 19 | 11 |
| 74 | 100 | 50 | 14 | 12 |
| 75 | 100 | 100 | — | — |

The mixtures of Examples 68 through 71 had relatively long pot life at 70° F and exhibited no apparent exotherm following mixing. There was no apparent color change and after eight days at 70° F, each mixture had cured to a hard, tough polymer. A sample of each mixture was held in an oven at 120° F and also cured to a hard, tough polymer. The mixture of Example 72 exhibited a low exotherm with a slow foaming action and the polymer was a cured foam which was hard and tough.

When the level of cupric fluoborate solution reached 30 grams as in Example 73, it became difficult to blend with the resin and the further levels shown in Examples 74 and 75 caused further blending difficulties and, in fact, the formulation of Example 75 could not be blended. The mixture of Example 73 formed a cream-like consistency after 1 to 2 minutes of mixing and an exothermic reaction developed slowly with a foaming reaction occuring after 19 minutes. A similar result occurred for the mixture of Example 74 and both mixtures cured to hard, tough foams as did an oven sample cured at 120° F.

The highly reactive resin described above and sold under the trademark Epirez 5044 was cured with varying levels of cupric fluoborate solution as shown in the following five examples.

| Example | Epirez 5044 gms. | Cupic Fluoborate 40% sol., gms. | Pot Life at 70° F, min. | Gel time 120° F, min. |
| --- | --- | --- | --- | --- |
| 76 | 100 | 1 | 10 | 6 |
| 77 | 100 | 2 | 7 | 5 |
| 78 | 100 | 4 | 3 | 4 |
| 79 | 100 | 15 | 8 | 8 |
| 80 | 100 | 30 | 4 | 4 |

The mixture of Example 76 reacted with a low exotherm, slight discoloration and gelled with an unusually fast reaction curing to a flexible polymer. The mixtures of Examples 77 and 78 reacted with a high exotherm emitting smoke and discolored with the mixture of 78 discoloring to a greater degree than that of Example 77.

The mixture of Example 79 was very easy to blend and reacted with a very high exotherm during gellation. A rapid foaming action took place and the mixture cured to a very flexible foam which was slightly discolored.

The mixture of Example 80 was also very easy to blend and exhibited a lower exotherm than the mixture of Example 79. The amount of foam produced was about the same as Example 79 and was slightly discolored and very flexible.

The following examples were run with the novolac resin described above and sold under the trademark Epirez 5155 using cupric fluoborate solution levels up to 6 grams per 100 grams of resin. In order to facilitate resin blending, the resin was heated to 120° F to lower its viscosity.

| Example | Epirez 5155 gms. | Cupric Fluoborate 40% sol., gms. | Pot Life at 120° F, min. |
| --- | --- | --- | --- |
| 81 | 100 | 1 | 7 |
| 82 | 100 | 2 | 4 |
| 83 | 100 | 4 | 2 |
| 84 | 100 | 6 | 1 |

The mixtures of Examples 81 and 82 reacted with a high exothermic reaction emitting smoke and discoloring. The mixtures of Examples 83 and 84 exhibited a very high exothermic reaction and also emitted smoke and discolored.

The butyl glycidyl ether modified resin described above and sold under the trademark Epirez 5071 was mixed with varying levels of cupric fluoborate solution up to 50 grams per 100 grams of resin.

| Example | Epirez 5071 gms. | Cupric Fluoborate 40% sol., gms. | Pot Life at 70° F, min. | 5 gm. gel time at 120° F min. |
| --- | --- | --- | --- | --- |
| 85 | 100 | 1 | 82 | 50 |
| 86 | 100 | 2 | 47 | 10 |
| 87 | 100 | 4 | 22 | 7 |
| 88 | 100 | 15 | 22 | 12 |
| 89 | 100 | 30 | 14 | 13 |
| 90 | 100 | 50 | 14 | 10 |

The mixture of Example 85 reacted with a low exotherm but with an unusually fast gellation time going from a liquid to a completely hard polymer in about 40 seconds. The cured resin was hard and tough.

The mixture of Example 86 exhibited an initial low exotherm followed by a rapid gellation time (15 sec.) which in turn was followed by a high secondary exothermic reaction during which the sample smoked and discolored. The mixture of Example 87 had an initial low exotherm followed by an almost instant gellation which in turn was followed by a very high exothermic reaction with smoking and charring of the sample.

The higher level of curring agent used in Example 88 resulted in a gentle foaming action after 22 minutes and cured to a hard tough foam with good cell structure. The mixture resin and curing agent blended easily.

The mixture of Example 89 was more difficult to blend than that of Example 88. Like the previous example, it gradually increased in exothermic heat until a gentle foaming action occurred after 14 minutes. The sample cured to a hard, tough foam with good cell structure.

The mixture of Example 90 was also difficult to blend and was incompletely blended when it started to foam. The resulting cured foam was obtained in quantity but had varying degrees of hardness and toughness.

The aliphatic polyglycidyl ether resin described above and sold under the trademark Epirez 5042 was cured with levels of 40% cupric fluoborate up to 6 grams per 100 grams of resin.

| Ex. | Epirez 5042 gms. | Cupric Fluoborate 40% sol., gms. | Pot Life at 70° F, min. | 5 gm. gel time at 120° F, min. |
|---|---|---|---|---|
| 91 | 100 | 1 | 16 | 4 |
| 92 | 100 | 2 | 14 | 4 |
| 93 | 100 | 4 | 10 | 2 |
| 94 | 100 | 6 | 8 | 2 |

The mixture of Example 91 reacted with a high exotherm and a flexible skin formed on the top surface when it gelled. The sample cured to a soft, flexible polymer with some discoloration. The mixtures of Examples 92, 93 and 94 reacted with a highly exothermic reaction causing smoking and discoloration.

Aqueous solutions of zinc fluoborate [$Zn(BF_4)_2$] containing 40% by weight of zinc fluoborate were next tried as a curing agent for various epoxy resins. This was used in a series of resins beginning with the bisphenol-A epichlorohydrin diepoxide resin described above and sold under the trademark Epirex 510.

| Ex. | Epirez 510 gms. | Zinc Fluoborate 40% sol., gms. | Pot Life at 70° F., hrs. | 5 gm. gel time at 120° F, min. |
|---|---|---|---|---|
| 95 | 100 | 1 | +48 | 126 |
| 96 | 100 | 2 | +48 | 110 |
| 97 | 100 | 4 | +48 | 55 |
| 98 | 100 | 6 | +48 | 42 |

Note that the pot life in the above examples is expressed in hours rather than minutes and the actual time may exceed the above-listed time since the sample held at 70° F had not gelled at the end of 48 hours. The sample of Example 95 also had not cured after 168 hours at 70° F.

The sample held at 120° F had a slightly tacky surface but was clear, hard and tough and no evidence of a high exothermic reaction was observed.

The mixtures of Examples 96, 97 nd 98 also had a pot life in excess of 48 hours and were not fully cured after 168 hours. The samples held at 120° F all cured to clear, hard, tough resins with no evidence of a high exothermic reaction.

The flexiblizing aliphatic diepoxide resin described above and sold under the trademark Epirez 502 was cured with levels of zinc fluoborate solution between 1 and 6 parts per 100 parts by weight of resin.

| Ex. | Epirez 502 gms. | Zinc Fluoborate 40% sol., gms. | Pot Life at 70° F, hrs. | 5 gm. gel time min. 120° F | 200° F |
|---|---|---|---|---|---|
| 99 | 100 | 1 | +264 | 390 | 45 |
| 100 | 100 | 2 | +264 | 390 | 120 |
| 101 | 100 | 4 | +264 | 390 | 900+ |
| 102 | 100 | 6 | +264 | 315 | 900+ |

The mixture of Example 99 was water white in color and after 264 hours at 70° F, had exhibited no increase in viscosity. The measurement was discontinued after 264 hours for each of the above four samples. At 120° F and at 200° F, the mixture cured to a soft, jellylike consistency.

The mixture of Example 100 exhibited a slight increase in viscosity at 70° F but nothing approaching a gel had formed after 264 hours, at which time the test was discontinued. Samples cured at 120° F and 200° F cured to a soft, jellylike consistency.

The mixture of Example 101 exhibited a greater increase in viscosity after 264 hours at 70° F but had still not gelled. The sample cured at 120° F was a soft, jelly-like substance. After 50 hours at 200° F, the sample surprisingly was not gelled and when it was later cooled to 70° F, its viscosity was almost identical to the viscosity of the sample which had been held at 70° F for 264 hours. The mixture was water white in color.

The mixture of Example 102 exhibited a still further increase in viscosity as compared to that of Example 101 after 264 hours at 70° F. The sample cured at 120° F was a soft, jelly-like substance but the sample held at 200° F surprisingly had not gelled and had a viscosity almost identical to that of the sample which had been held at 70° F for 264 hours.

Examples 103 through 106 below utilized the abovedescribed epoxy resin sold under the trademark Epirez WD-510 and were cured with a 40% aqueous solution of zinc fluoborate.

| Ex. | Epirez WD-510, gms. | Zinc Fluoborate 40% sol., gms. | Pot Life at 70° F, hrs. | 5 gm. gel time hrs. 120° F | 200° F |
|---|---|---|---|---|---|
| 103 | 100 | 1 | +264 | 8 | 2 |
| 104 | 100 | 2 | +264 | 8 | 2 |
| 105 | 100 | 4 | +240 | 5 | 2 |
| 106 | 100 | 6 | +240 | 4 | 2 |

The mixtures of Examples 103 and 104 had not gelled after 264 hours. All samples showed a gradual increase in viscosity with no detectable exothermic reaction. The samples cured at 200° F were hard and tough. The samples cured at 120° F were also hard and tough but had a tacky surface.

A series of experiments were run using the zinc fluoborate solution as a curing agent for the epoxy resin sold under the trademark Epirez 5044.

| Ex. | Epirez 5044 gms. | Zinc Fluoroborate 40% sol., gms. | Pot Life at 70° F, hrs. | 5 gm. gel time at 120° F, min. |
|---|---|---|---|---|
| 107 | 100 | 1 | 48 | 90 |
| 108 | 100 | 2 | 48 | 51 |
| 109 | 100 | 4 | 48 | 30 |
| 110 | 100 | 6 | 96 | 25 |

The mixtures of Examples 107 through 109 cured at 70° F to a flexible polymer with a tacky surface. Mixtures cured at 120° F were flexible and tough without a tacky surface. The mixtured of Example 110 cured to a flexible tough polymer without a surface tack at both 70 and 120° F.

A series of mixtures using the above-described epoxy resin sold under the trademark Epirez 5155 are described below. Since this resin has a high initial viscosity, it was heated to 120° F in order to facilitate mixing. After mixing, the sample was cooled to 70° F to determine pot life.

| Ex. | Epirez 5155 gms. | Zinc Fluoroborate 40% sol., gms. | Pot Life at 70° F, hrs. | 5 gm. gel time at 120° F, min. |
|---|---|---|---|---|
| 111 | 100 | 1 | 48 | 105 |
| 112 | 100 | 2 | 10–12 | 60 |
| 113 | 100 | 4 | 8–10 | 33 |
| 114 | 100 | 6 | 7–9 | 25 |

The mixture of Example 111 has a long pot life at 70° F but slowly formed a soft polymer which, after 168 hours, had not fully cured. A sample held at 120° F was soft although it gelled after 1 hour 45 minutes. No exothermic heat was apparent during this reaction.

The mixtures of Examples 112 through 114 also had a long pot life at 70° F during which time the viscosity slowly increased with no visible exothermic heat except that the mixture of Example 114 at times exhibited a slight amount of exothermic heat. All samples cured both at 70° F and 120°F formed hard, tough polymers.

A series of mixtures were made with the zinc fluoborate curing agent and the above-described epoxy resin sold under the trademark Epirez 5071.

| Ex. | Epirez 5071 gms. | Zinc Fluoborate 40% sol., gms. | Pot Life at 70° F, hrs. | 5 gm. gel time at 120° F, hrs. |
|---|---|---|---|---|
| 115 | 100 | 1 | 144 | 3–16 |
| 116 | 100 | 2 | 144 | 3–16 |
| 117 | 100 | 4 | 144 | 3–16 |
| 118 | 100 | 6 | 144 | 3–16 |

The mixtures of Examples 115 and 118 exhibited a slow increase in viscosity with no evidence of an exothermic reaction at 70° F. After 144 hours, the mixture had a very high viscosity but still had not polymerized. The oven-cured sample at 120° F was soft and flexible.

The mixtures of Examples 116 and 117 also exhibited a slow increase in viscosity with no evidence of exotherm at 70° F. A jellylike substance had formed after 144 hours at 70° F. A sample cured at 120° F was flexible and tough.

The epoxy resin having good low temperature reactivity sold under the trademark Epirez 5042 and more fully described above, was mixed with varying levels of zinc fluoborate.

| Ex. | Epirez 5042 gms. | Zinc Fluoborate 40% sol., gms. | Pot Life at 70° F, hrs. | 5 mg. gel time at 120° F, min. |
|---|---|---|---|---|
| 119 | 100 | 1 | 96 | 120 |
| 120 | 100 | 2 | 43 | 64 |
| 121 | 100 | 4 | 43 | 50 |
| 122 | 100 | 6 | 72 | 40 |
| 123 | 100 | 15 | 72+ | 180 |
| 124 | 100 | 30 | 72+ | 180 |

The mixtures of Examples 119 through 122 gradually increased in viscosity without noticeable exothermic heat. The mixture of Example 19 cured to a flexible polymer both at 70° F and at 120° F. The mixtures of Examples 120 through 122 cured to very tough flexible polymers at both 70° F and 120° F. The mixtures of Examples 123 and 124 were very easy to blend and gradually increased in viscosity without noticeable exothermic heat at 70° F. A flexible, tough polymer formed when samples were cured at 70° and 120° F. The 5 gram gel time was also measured at 200° F and was found to be 15 minutes. A sample was also cured at 200° F and showed indications of foaming and formed a tough and flexible polymer.

A series of mixtures were made using relatively high levels of zinc fluoborate and different resins. The first set of examples used the above-described resin sold under the trademark Epirez 510.

| Ex. | Epirez 510 gms. | Zinc Fluoborate 40% sol., gms. | Pot Life at 70° F, hrs. | 5 gm. gel time at 120° F, hrs. |
|---|---|---|---|---|
| 125 | 100 | 15 | 12 | 3.5 |
| 126 | 100 | 30 | 10 | 3 |

The mixture of Example 125 was somewhat difficult to blend but after 15 minutes, a homogeneous blend was obtained which gelled with no apparent exotherm. The blend at 70° F was not completely hard after 168 hours but the sample cured at 120° F to a hard, tough polymer.

The mixture of Example 126 was also difficult to blend but appeared to be of a uniform consistency after 15 minutes of blending. There was no apparent exotherm at 70° F and after 60 hours the mixture was hard. The sample held at 120° F cured to a hard, tough polymer.

| Ex. | Epirez 502 gms. | Zinc Fluoborate 40% sol., gms. | Pot Life at 70° F, hrs. | 5 gm. gel time hrs. 120° F | 200° F |
|---|---|---|---|---|---|
| 127 | 100 | 15 | 1 | 24 | 16 |
| 128 | 100 | 30 | 1 | 24 | 16 |

The above-described resin sold under the trademark Epirez 502 was mixed as indicated above and both the mixtures of Examples 127 and 128 reacted with a very mild exotherm at 70° F within 1 hour after mixing at which time the viscosity increased. After 72 hours, no additional viscosity increase was noted and the sample remained liquid. Both samples at 120° F and 200° F reached a soft jellylike consistency after several hours and maintained the same consistency. This mixture is considered to have formed a zinc fluoborate-resin partial rection or adducted mixture. These mixtures were used as hardeners in subsequent examples.

The above-described resin sold under the trademark Epirez 5044 was mixed in the proportions indicated below.

| Ex. | Epirez gms. | 40% sol., gms. | Pot Life 70° F, hrs. | 5 gm. gel 120° hrs. |
|---|---|---|---|---|
| 129 | 100 | 15 | 216 | 10 |
| 130 | 100 | 30 | 130 | 8 |

The mixture of Example 129 was very easy to blend and showed a gradual rise in viscosity with no apparent exotherm. The mixture became nonpourable in approximately 216 hours at 70° F. The sample at 120° F cured to a soft, pliable polymer.

The mixtures of Example 130 was also easy to blend and rose in viscosity with no apparent exotherm. The sample held at 120° F cured to a soft, pliable polymer.

| Ex. | Epirez 5071 gms. | Zinc Fluoborate 40% sol., gms. | Pot Life at 70° F, hrs. | 5 gm. gel time at 120° F, min. |
|---|---|---|---|---|
| 131 | 100 | 15 | 120 | 65 |
| 132 | 100 | 30 | 48 | 56 |

The above-described modified resin sold under the trademark Epirez 5071 was mixed with 15 and 30 grams of zinc fluoborate solution. The mixture of Example 131 was easy to blend and increased in viscosity with no apparent exotherm becoming jellylike in about 120 hours at 70° F. After 240 hours, the sample had about the same consistency. It reached this consistency in about 65 minutes at 120° F and after 120 hours, the hardness had increased only slightly.

The mixture of Example 132 was difficult to blend but became uniform in consistency after about 15 minutes of mixing. The mixture gradually increased in viscosity with no apparent exotherm until it formed a jellylike consistency in approximately 48 hours at 70° F. After 240 hours, the mixture had reached a soft, pliable polymeric condition. A mixture held at 120° F was jellylike in consistency at the end of 56 minutes and reached a soft polymeric condition in approximately 24 hours.

An aqueous solution of nickel fluoborate [Ni(BF$_4$)$_2$] typically averaging 44.7% by weight (herein nominally 45%) was used in combination with several different types of epoxy resin. The first set of examples shows its use with the above-described resin sold under the trademark Epirez 510. This nickel fluoborate solution is commercially available and is recommended for use in nickel electroplating. A typical analysis shows 11.3% by weight nickel and 1.4% by weight of free boric acid. The reslts were as follows:

| Ex. | Epirez 510 gms. | Nickel Fluoborate 45% sol., gms. | Pot Life at 70° F, hrs. | 5 gm. gel time at 120° F, min. |
|---|---|---|---|---|
| 133 | 100 | 1 | — | 240 |
| 134 | 100 | 2 | 26 | 120 |
| 135 | 100 | 4 | 4.75 | 44 |
| 136 | 100 | 6 | 3.5 | 40 |
| 137 | 100 | 15 | 59 min. | 35 |
| 138 | 100 | 30 | 35 min. | 25 |
| 139 | 100 | 50 | — | — |

The pot life of the mixture of Example 133 exceeds 168 hours at 70° F but the mixture will cure at 120° F in a 5 gram mass in 4 hours yielding a hard polymer with a slight amount of surface tack. There was no evidence of an exothermic reaction.

The mixture of Example 134 cured in 2 cured in 2 hours at 120° F to a hard polymer with a very slight amount of surface tack. No exothermic reaction was noticed and a sample held at 70° F had not completely cured after 168 hours.

The mixture of Example 135 evidenced no exothermic reaction but a sample held at 120° F cured to a hard, tough clear polymer. The mixture of Example 136 also cured to a clear, hard, tough polymer at 120° F. No evidence of an exothermic reaction was apparent.

The mixture of Example 137 was difficult to blend, and at first was similar to an attempt to blend motor oil and water, As the reaction progressed, however, complete compatibility appeared to have been achieved. An exothermic reaction took place with mild foaming during curing. The final product was a cured foam which was hard and tough. The mixture of Example 138 exhibited the same characteristics as that of 137 except that more foam was produced.

The mixture of Example 139 was very incompatible and, although some reaction was observed, the mixture never became completely homogeneous.

A series of mixtures using the above-described resin sold under the trademark Epirez 502 is shown below.

| Ex. | Epirez 502 gms. | Nickel Fluoborate 45% sol., gms. | Pot Life at 70° F, hrs. | 5 gm. gel time hrs. 120° F | 200° F |
|---|---|---|---|---|---|
| 140 | 100 | 1 | 192+ | 6 | 2 |
| 141 | 100 | 2 | 192+ | 6 | .67 |
| 142 | 100 | 4 | 192+ | 7 | .67 |
| 143 | 100 | 6 | 192+ | 7 | 2 |
| 143A | 100 | 15 | — | — | — |
| 143B | 100 | 30 | — | — | — |

The mixture of Example 140 had no apparent viscosity change after 192 hours at 70° F and gave no indication of an exothermic reaction. Semi-rigid polymers having some surface tack resulted from curing samples at both 120° and 200° F.

The mixtures of Example 141 and 142 showed a slight increase in viscosity with no noticeable exotherm at 70° F after 192 hours. Samples held at 120° and 200° F cured to semi-rigid polymers with slight surface tack.

The mixture of Example 143 showed a definite increase in viscosity after 192 hours at 70° F but there was no evidence of an exothermic reaction. A flexible jellylike substance resulted from curing samples at 120° and 200° F.

The mixtures of 143A and 143B were easy to blend and after 144 hours at 70° F. exhibited only a slight increase in viscosity. Samples held at 120° F and 200° F also showed only a sight increase in viscosity after 69 hours. It is believed that this mixture formed a resin-nickel fluoborate adduct.

| Ex. | Epirez WD-510 gms. | Nickel Fluoborate 45% sol., gms. | Pot Life at 70° F, hrs. | 5 mg. gel time, hrs. 120° F | 200° F |
|---|---|---|---|---|---|
| 144 | 100 | 1 | — | 20 | 4 |
| 145 | 100 | 2 | — | 10 | 4 |
| 146 | 100 | 4 | — | 6 | 4 |
| 147 | 100 | 6 | 120 | 4.5 | 4 |
| 147A | 100 | 15 | 12 | 75 | 13 |
| 147B | 100 | 30 | 1.25 | 33 | 7 |

The mixture of Example 144 blended easily and had only a slight increase in viscosity with no apparent exotherm after 196 hours at 70° F. Samples held at 120° and 200° F cured to a hard polymer with a tacky surface.

The mixture of Examples 145 and 146 were also easy to blend and had a definite increase in viscosity with no apparent exotherm after 196 hours at 70° F. The mixture, after this time, was still pourable. Both samples at 120° and 200° F cured to a hard, tough polymer.

The mixture of Example 147 blended easily and increased in viscosity to the point that it was nonpourable in approximately 120 hours at 70° F. No exotherm was apparent. Hard, tough polymers resulted from holding samples at 120° and 200° F.

The mixture of 147A was very easy to blend and gradually increased in viscosity with no apparent exotherm at 70° F. Samples held at 120° and 200° F cured to hard, tough polymers.

The mixture of Example 147B was easy to blend and exhibited a mild exothermic reaction with a gradual increase in viscosity followed by foaming with a very low pressure. The foam cured to a hard, tough polymer. The sample held at 120° F cured to a hard, tough polymer whereas the sample held at 200° F foamed considerably and cured to a hard, tough material.

| Ex. | Epirez 5044 gms. | Nickel Fluoborate 45% sol., gms. | Pot Life at 70° F, hrs. | 5 gm. gel time at 120° F, min. |
|---|---|---|---|---|
| 148 | 100 | 1 | +168 | 270 |
| 149 | 100 | 2 | 96 | 127 |
| 150 | 100 | 4 | 96 | 100 |
| 151 | 100 | 6 | 96 | 65 |
| 152 | 100 | 15 | 48 | 60 |
| 153 | 100 | 30 | 58 | 60 |

The mixture of Example 148 had not gelled at the end of 168 hours at 70° F. The sample held at 120° F cured to a flexible polymer wth a tacky surface.

The mixture of Example 149 had not completely cured at the end of 168 hours at 70° F. A sample held at 120° F cured to a flexible, tough polymer.

The mixtures of Examples 150 and 151 cured slowly at 70° F to flexible, tough polymers. The sample held at 120° F also formed a flexible, tough polymer.

The mixture of Example 152 was easy to blend and slowly increased in viscosity with no apparent exothermic reaction. Samples held at 70° F and 120° F cured to semiflexible, tough polymers.

The mixture of Example 153 was also easy to blend and developed an exothermic reaction prior to gellation. The sample foamed and cured to a flexible foam with no discoloration. The sample cured at 120° F cured to a flexible, tough polymer.

| Ex. | Epirez 5155 gms. | Nickel Fluoborate 45% sol., gms. | Pot Life at 70° F, min. | 5 gm. gel time at 120° F. min. |
|---|---|---|---|---|
| 154 | 100 | 1 | 30 | 60 |
| 155 | 100 | 2 | 15 | 18 |
| 156 | 100 | 4 | 12 | 20 |
| 157 | 100 | 6 | 9 | 23 |

The above-identified resin sold under the trademark Epirez 5155 was heated to 120° F in order to lower its viscosity and facilitate mixing. The sample was then cooled to 70° F to determine pot life at 70° F. The mixture of Example 154, although having a relatively short pot life, had not cured after 168 hours at 70° F. The sample held at 120° F was hard and tough.

The mixtures of Examples 155 to 157 cured to hard, tough polymers both at 70° F and 120° F with a slight exothermic reaction being observed in each instance.

| Ex. | Epirez 5071 gms. | Nickel Fluoborate 45% sol., gms. | Pot Life at 70° F, hrs. | 5 gm. gel time at 120° F, hrs. |
|---|---|---|---|---|
| 158 | 100 | 1 | 240+ | 48 |
| 159 | 100 | 2 | 240+ | 48 |
| 160 | 100 | 4 | 96 | 24 |
| 161 | 100 | 6 | 24 | 24 |

The mixtures of Examples 158 and 159 were still liquid after 240° hours at 70° F with only a slight increase in viscosity and no evidence of an exothermic reaction. Samples held at 120° F cured to semi-flexible polymers each of which had a tacky surface.

The mixture of Example 160 gradually increased in viscosity with no apparent exothermic reaction and had reached a jellylike consistency after 96 hours at 70° F. Curing continued and after 240 hours, the mixture was hard but had a tacky surface. A sample held at 120° F cured to a hard polymer with a tacky surface.

The mixture of Example 161 also increased in viscosity but no apparent exotherm at 70° F and was in a jellylike consistency after 24 hours. After 240 hours, the mixture was hard but still had a tacky surface. The sample held at 120° F cured to a hard, tough polymer.

| Ex. | Epirez 5042 gms. | Nickel Fluoborate 45% sol., gms. | Pot Life at 70° F, hrs. | 5 gm. gel time 120° F | 5 gm. gel time 200° F |
|---|---|---|---|---|---|
| 162 | 100 | 1 | 192+ | 48 hrs. | — |
| 163 | 100 | 2 | 192+ | 48 hrs. | — |
| 164 | 100 | 4 | 192+ | 48 hrs. | — |
| 165 | 100 | 6 | 192+ | 48 hrs. | — |
| 166 | 100 | 15 | 96 | 77 min. | 6 min. |
| 167 | 100 | 30 | 60 | 66 min. | 4 min. |

The mixtures of Examples 162 and 163 showed no detectable increase in viscosity after 192 hours at 70° F and exhibited no exothermic reaction. The sample held at 120° F increased slowly in viscosity and after 48 hours was considered too high in viscosity to pour. The sample held at 120° F cured to a tough, flexible polymer.

The mixture of Examples 164 and 165 increased gradually in viscosity during the first 48 hours at 70° F but appeared to remain stable after 192 hours. The samples held at 120° F increased in viscosity slowly and after 48 hours could not be poured. The two samples held at 120° F to tough, flexible polymers. The mixture of Example 166 was easy to blend and had a gradual increase in viscosity with no apparent exotherm at 70° F. The polymer had reached a jellylike consistency at approximately 96 hours at 70° F. The sample held at 120° F gelled to a flexible polymer with a tacky surface. The sample held at 200° F foamed slightly with some discoloration but cured to a flexible polymer.

The mixture of Example 167 was easy to blend and increased in viscosity with no apparent exotherm reaching a jellylike consistency in approximately 60 hours at 70° F. The sample held at 120° F gelled to a flexible polymer with a tacky surface. The sample held at 200° F foamed considerably with no discoloration and cured to a flexible polymer.

An aqueous solution of lead fluoborate [Pb(BF$_4$)$_2$] at a concentration of 40% by weight was used in order to determine its effect on several different epoxy resins. This compound is commercially available and used for tin-lead plating such as those used in the manufacture of bearings.

A first series was run using the above-described epoxy resin sold under the trademark Epirez WD-510.

| Ex. | Epirez WD-510, gms. | Lead Fluoborate 40% sol., gms. | Pot Life at 70° F, hrs. | 10 gm. pot life min. 120° F | 10 gm. pot life min. 200° F |
|---|---|---|---|---|---|
| 168 | 100 | 1 | 2.33 | 48 | 31 |
| 169 | 100 | 2 | 1.8 | 18 | 3 |
| 170 | 100 | 4 | 1.8 | 15 | 3 |
| 171 | 100 | 6 | 1.8 | 10 | 3 |

The mixtures of Examples 168 and 169 were easy to blend with no evidence of separation. They gradually increased in viscosity at 70° F until gellation occurred with a low exotherm. Samples held at 70°, 120° and 200° F all cured to very clear, hard, tough polymers. The mixture of Example 170 was also easy to blend with no evidence of separation. It increased in viscosity at 70° F until gellation occurred accompanied by moderate exotherm. Samples cured at 70°, 120° and 200° F all showed slight foaming characteristics but cured to hard, tough and clear polymers.

The mixture of Example 171 was very easy to blend and exhibited a moderate exotherm at 70° F. Samples held at each of the three temperatures foamed and expanded approximately two times by volume with slight discoloration curing to hard, tough polymers.

The following experiments were run using the aliphatic diepoxide resin described above and sold under the trademark Epirez 502.

| Example | Epirez 502, gms. | Lead Fluoborate 40% sol., gms. |
|---------|------------------|-------------------------------|
| 172 | 100 | 1 |
| 173 | 100 | 2 |
| 174 | 100 | 4 |
| 175 | 100 | 6 |
| 176 | 100 | 15 |

The mixture of Example 172 was very easy to blend but after about 4 minutes a milky white substance began to form and settled to the bottom of the container and gelled to a soft, flexible substance. The balance of the resin mixture was still liquid after 7 days at 70° F.

The mixture of Example 172 was again prepared and blended continuously until gellation occurred at approximately 24 hours. A very slight milky appearance was noted during mixing which disappeared after approximately 1 hour. The sample cured to a very soft rubbery consistency with no apparent exotherm.

The mixture of Example 173 reacted in the same manner as the mixture of Example 172. Again, two separate samples were run wherein the second sample was continuously stirred with the same results.

The mixture of Example 174 reacted in the same manner as that of 172 and 173 except that the cured product was softer and more rubbery and a low exotherm was noted. The mixture of Example 175 reacted similarly to that of 174 except that a moderate exotherm was noted and the cured product was more jellylike in consistency.

The mixture of Example 176 was continuously blended and was very easy to blend. A slight milky appearance developed after about 4 minutes and this disappeared in about 14 minutes. At this disappearance, an exothermic condition became apparent and the temperature reached 218° F at the rate of 12° F per minute. After exotherm, the mixture remained liquid and as the temperature dropped, the viscosity increased. When the temperature had reached 70° F a moderately light viscosity liquid remained. It is believed that this liquid is an adducted lead fluoroborate-Epirez 502 reaction product useful as a curing agent for other epoxy resins.

The mixture of Example 65, described above, is believed to be an adduct of the resin sold under the trademark Epirez 502 and copper fluoborate is referred to below as "adduct Ex. 65". This was used as a curing agent for the epoxy resin sold under the trademark Epirez WD-510.

| Ex. | Epirez WD-510, gms. | "Adduct Ex. 65," gms. | Pot Life at 70° F, hrs. | 5 gm. gel time at 120° F, hrs. |
|-----|---------------------|----------------------|-------------------------|-------------------------------|
| 177 | 100 | 2 | — | — |
| 178 | 100 | 10 | — | 3.75 |
| 179 | 100 | 20 | 48 | 2.75 |

The mixture of Example 177 was very easy to blend but the samples both at 70° and 120° F had not gelled at the end of 96 hours. The mixture of Example 178 exhibited no apparent exotherm but gradually increased in viscosity but could still be poured after 96 hours at 70° F. A sample held at 120° F cured to a tough polymer.

The mixture of Example 179 was very easy to blend and had no apparent exotherm but increased in viscosity and after 48 hours at 70° F, the mixture was not pourable. This same mixture had not cured at the end of 96 hours at 70° F. The sample held at 120° F gelled and then cured to a hard, very tough polymer.

The reaction product of the resin sold under the trademark Epirez 502 and a solution of zinc fluoborate as described above in Example 127 is referred to below as "Adduct Ex. 127". This adduct was used as a curing agent as shown below.

| Example | Epirez 510 gms. | "Adduct Ex. 127" gms. | Pot Life at 70° F | 5 gm. gel time at 120° F | 200° F |
|---------|-----------------|----------------------|-------------------|--------------------------|--------|
| 180 | 100 | 2 | — | — | — |
| 181 | 100 | 10 | — | 6 hrs. | 21 min. |
| 182 | 100 | 20 | — | 4.5 hrs. | 13 min. |

The mixture of Example 180 increased in viscosity but no gelling occurred even at 200° F after 91 hours.

The mixture of Example 181 was very easy to blend and gradually increased in viscosity with no apparent exotherm. The samples held at 120° and 200° F cured to hard, tough polymers. The mixture of Example 182, although having shorter gel times, behaved in the same manner as the mixtures of Example 181.

This same adduct was next used as a curing agent for the resin sold under the trademark Epirez WD-510.

| Ex. | Epirez WD-510, gms. | "Adduct Ex. 127" gms. | Pot Life 70° F | 5 gm. gel time at 120° F | 200° F |
|-----|---------------------|----------------------|----------------|--------------------------|--------|
| 183 | 100 | 2 | — | — | — |
| 184 | 100 | 10 | — | 48 hrs. | 8 min. |
| 185 | 100 | 20 | — | 48 hrs. | 6 min. |

The mixture of Example 183 was very easy to blend and after 70 hours at 70° F, no appreciable change in viscosity was noted. The sample held at 120° F had increased in viscosity but after 70 hours was still pourable. The sample held at 200° F increased rapidly in viscosity but had not gelled at the end of 70 hours.

The mixture of Example 184 was also easy to blend and after 70 hours at 70° F had increased in viscosity but was still pourable. The sample at 120° F formed a soft gel after about 48 hours. The sample cured to a hard, tough polymer with a tacky surface after 70 hours. The sample held at 200° F gelled rapidly and cured to a hard, tough polymer.

The mixture of Example 185 was also easy to blend and was still pourable after 70 hours at 70° F. No exotherm was noted. The sample held at 120° F increased in viscosity until a soft gel formed in about 48 hours. The sample cured to a hard, very tough polymer with a slightly tacky surface after 70 hours at 120° F. The sample held at 200° F gelled rapidly and cured to a hard, very tough polymer.

The reaction mixture described in Example 128 above like that of 127, is a combination of Epirex 502 and zinc fluoborate with a higher level of the latter. This reaction mixture is referred to below as "adduct Ex. 128".

| Example | Epirez 510 gms. | "Adduct Ex. 128", gms. | Pot Life 70° F | 5 gm. gel time 120° F | 5 gm. gel time 200° F |
|---|---|---|---|---|---|
| 186 | 100 | 2 | — | 50 hrs. | 50 hrs. |
| 187 | 100 | 10 | — | 20 hrs. | 6 min. |
| 188 | 100 | 20 | — | 20 hrs. | 5 min. |

The mixtures of all three of the above examples were very easy to blend. The mixture of Example 186 increased slightly in viscosity after 70 hours at 70° F and had gelled in about 50 hours at 120° F. After 70 hours at 120° F, the surface of the sample was still very tacky. The sample held at 200° F had a gradual increase in viscosity until it gelled in about 50 hours and after 70 hours still had a tacky surface.

The mixture of Example 187 was very pourable after 70 hours at 70° F. The sample held at 120° F had a gradual increase in viscosity until it gelled in about 20 hours and cured to a very tough polymer. The sample held at 200° F had a fast gellation time and cured to a very tough polymer.

The mixture of Example 188 cured to a very tough polymer at 120° although it was still pourable after 70 hours at 70° F. The sample cured at 200° F had a very fast gellation with some discoloration and cracking.

This same curing agent was used to cure the epoxy resin sold under the trademark Epirez WD-510.

| Ex. | Epirez WD-510, gms. | "Adduct Ex. 128", gms. | Pot Life 70° F | 5 gm gel time at 120° F | 5 gm gel time at 200° F |
|---|---|---|---|---|---|
| 189 | 100 | 2 | — | 48 hrs. | 36 hrs. |
| 190 | 100 | 10 | — | 48 hrs. | 6 min. |
| 191 | 100 | 20 | — | 48 hrs. | 5 min. |

As with the other adduct curing agents, the mixture was very easy to blend. It exhibited only a slight increase in viscosity with no apparent exotherm after 69 hours at 70° F. The sample at 120° F had a very tacky surface after 69 hours. The sample held at 200° F was soft with a tacky surface after 69 hours.

The mixture of Example 190 was still pourable after 69 hours at 70° F. The sample held at 120° F was hard and tough with a slight surface tack after 69 hours. A hard, very tough polymer resulted from curing a sample at 200° F.

The mixture of Example 191 had a slight surface tack after being held at 120° F. The sample held at 200° F had a fast gellation with some discoloration and cracking during gellation but cured to a hard, tough polymer.

A 47% aqueous solution of silver fluoborate (AgBF$_4$) was used as a curing agent for the above-described epoxy resin sold under the trademark Epirez 510.

| Ex. | Epirez 510 gms. | Silver Fluoborate 47% sol., gms. | Pot Life 70° F | 10 gm. pot life 120 | 10 gm. pot life 200 | 10 gm. pot life 400° F |
|---|---|---|---|---|---|---|
| 192 | 100 | 1 | — | — | — | — |
| 193 | 100 | 2 | — | — | — | — |
| 194 | 100 | 4 | — | — | 48 hr. | 6 hrs. |
| 195 | 100 | 6 | — | — | 48 hr. | 6 hrs. |
| 196 | 100 | 25 | 48 hrs. | 48 hr. | 24 hr. | 4 hr. |
| 197 | 100 | 50 | 10 min. | 10 min. | 10 min. | 10 min. |

The mixtures of Examples 192 and 193 were very easy to mix showing no evidence of separation at any temperature. None of the samples cured, however, even after 48 hours, the sample which had been held at 400° F showed some increase in viscosity when cooled to room temperature.

The mixture of Example 194 was also easy to mix and at 200° and 400° F showed a gradual increase in viscosity until gellation when some exothermic reaction became apparent. Both samples formed bubbles and were polymerized to soft, flexible polymers with rather poor properties. The same was true of Example 195.

The mixture of Example 196 was quite easy to blend and gradually increased in viscosity until gellation, at which time an excessive exothermic reaction became apparent. The samples cured with bubbles entrapped in them. The samples were hard but appeared brittle and exhibited some cracking and discoloration.

The mixture of Example 197, although about ½ catalyst solution, was very easy to blend. The sample held at 70° F developed a very rapid exotherm and gelled in 10 minutes with some foaming action and vapor emission. The samples held at 120°, 200° and 400° F also exhibited evidence of a high exotherm and cured to a brittle polymer with some cracking and was of generally poor quality.

A series of mixtures were made to determine the effect of the fluoborate curing agents on various resin formulations containing fillers. Examples 198 and 199 used the flame retarding filler, antimony trioxide (Sb$_2$O$_3$) in the physical form of a superfine white powder sold under the trademark Thermoguard S. The resin used, that described above and sold under the trademark Epirez 510 was mixed with an equal weight of antimony oxide and the catalyst solution was added to this mixture.

| Example | Epirez 510 Sb$_2$O$_3$ Mix. | Tin Fluoborate 50% sol., gms. | Pot Life 70° F, min. | 10 gm. gel time at 120° F, min. |
|---|---|---|---|---|
| 198 | 100 | 3 | 4.5 | 4 |

The mixture of Example 198 was easy to blend and had a high viscosity which dropped slightly as a moderate exotherm developed. There was a slight foaming action at the time of gellation for samples held at both 70° and 120° F. The polymer cured at 120° F was subjected to a 3 minute burn test by direct exposure to a propane torch. It emitted very light smoke after about 15 seconds which gradually increased to light black smoke after 30 seconds which further increased to moderate black smoke after two minutes and 15 seconds. The sample was self-extinguishing after 1½ minutes.

EXAMPLE 199

Example 198 was duplicated except that a 40% aqueous solution of copper fluoborate was substituted for the solution of tin fluoborate. The mixture had a pot life of 10 hours at 70° F and a 10 gram gel time at 120° F of 46 minutes. The mixture was easy to blend and gradually increased in viscosity with no apparent exotherm. Samples held at 70° and 120° F cured to hard, tough polymers. A 10 gram sample of the cured polymer was subjected to a 3 minute burn test by direct exposure to a propane torch. Light black smoke and small particles were observed after 15 seconds which continued for another 15 seconds when the particles and the black smoke increased to a moderate level after 2.5 minutes. The sample was self-extinguishing in 45 seconds.

A silicon dioxide filler having a typical chemical composition of 99.12% SiO$_2$ with traces of iron oxides, titanium oxide and aluminum oxide and sold under the trademark Novacite L-207A. It is supplied as a 100% less than 10 micron size product and is identified in the table below as "L-207A".

| Example | Epirez WD-510, gms. | L-207A gms. | Tin Fluoborate 50% sol. gms. | Copper Fluoborate 40% sol. gms. | Pot Life 70° F | 10 gm. gel time 120° F |
|---|---|---|---|---|---|---|
| 200 | 50 | 50 | 3 | — | 8 min. | 7 min. |
| 201 | 50 | 50 | — | 3 | 1 hr. | 24 min. |

The mixture of Example 200 was easy to blend and dropped in viscosity with an exothermic reaction occurring. The mixture set to a hard polymer with an almost instant polymerization after gellation. The sample cured at 120° F was hard and tough and was subjected to a flame test by direct exposure to a propane torch. The test sample became red hot and a very light black smoke was emitted after 15 seconds. After 1 minute, small particles were emitted and the smoke density doubled. After 3 minutes, the torch was removed and the sample continued to burn.

The mixture of Example 201 was very easy to blend and cured to a hard, very tough polymer. The sample cured at 120° F was also subjected to direct exposure to a propane torch flame. The test sample became red hot and a moderate amount of smoke and small particles were emitted after 15 seconds. After 1 minute, the amount of smoke and particles increased to approximately double the level at 15 seconds. After 3 minutes, the torch was removed and the sample continued to burn.

Examples 202 and 203 were run using bleached white barytes which is natural barium sulphate. The particular form used was essentially pure and approximately 325 mesh.

| Example | Epirez WD-510, gms. | Barytes gms. | Tin Fluoborate 50% sol., gms. | Copper Fluoborate 40% sol. gms. | Pot Life 70° F | 10 gm. gel time 120° F |
|---|---|---|---|---|---|---|
| 202 | 50 | 50 | 3 | — | 3 min. | 2 min. |
| 203 | 50 | 50 | — | 3 | 3.75 hr. | 25 min. |

The mixture of Example 202 was very easy to blend and reacted exothermically followed by a rapid gellation. A slight amount of foaming occurred at gellation and the cured sample showed lines along the surface as if long linear chains were formed. The cured sample was very tough but not as hard as those of Examples 200 and 201. The sample cured at 120° F was subjected to the flame of a propane torch and produced heavy black smoke after 15 seconds exposure and particles after 30 seconds of exposure. Heavy smoke was produced after 2½ minutes and the sample continued to burn after 3 minutes exposure to the open flame.

The mixture of Example 203 was also easy to blend and reacted exothermically with a slow increase in viscosity during the 3.75 hours it took to gel. The mixture cured to a very tough hard polymer. The sample cured at 120° F was subjected to the flame of a propane torch and produced a heavy black smoke after 15 seconds, emitted particles after 30 seconds, heavy smoke after 2½ minutes and continued to burn after 3 minutes of exposure to the flame.

Hydrated alumina was used as a filler in the following four examples. The hydrated alumina used was a 325 mesh product which was essentially pure aluminum trihydroxide with only traces of metallic oxides and is sold under the trademark "RH-31F". Four different fluoborate solutions were utilized and these are indicated below by the metallic portion of the salt where "tin" indicated a 50% water solution of tin fluoborate, "Copper" indicates a similar 40% water solution, "zinc" indicates a 40% solution of the zinc salt and "nickel" indicates a 45% solution of nickel fluoborate in water. In each instance, 3 grams of the solution were used.

| Ex. | Epirez WD-510 gms. | RH-31F gms. | 3 gms. Fluoborate Salt sol. | Pot Life at 70° F | 10 gm. gel time at 120° F |
|---|---|---|---|---|---|
| 204 | 50 | 50 | "tin" | 10 min. | 9 min. |
| 205 | 50 | 50 | "Copper" | 67 min. | 19 min. |
| 206 | 50 | 50 | "Zinc" | 3-4 hrs. | 34 min. |
| 207 | 50 | 50 | "Nickel" | 2-3 hrs. | 20 min. |

The resin and hydrated alumina were first mixed and the curing agent solution added to the mixture. When the tin fluoborate solution was added to the mixture of Example 204, an increase in viscosity was noted and the mixture became a soft, cream-like substance. After 10 minutes, a very rapid gellation was observed accompanied by an exothermic reaction and a small amount of foaming. The mixture cured to a hard, tough polymer. The sample held at 120° F was subjected to the flame from a propane torch. The sample emitted light smoke and fine particles after 10 seconds, and after 2 minutes exposure, the smoke density increased slightly. After 3 minutes of exposure, the flame was removed and the sample was self-extinguishing within 30 seconds.

The mixture of Example 205 increased in viscosity when the curing agent was added and also became a soft, cream-like substance which was very easy to work with. A mild exothermic reaction occurred with a gradual increase in heat and the mixture cured to a hard, tough polymer with a slight amount of discoloration. The sample held at 120° F cured to a polymer which was exposed to the flame of a propane torch. Low smoke density was noted after 10 seconds exposure and after 2 minutes exposure, the smoke density was almost unnoticeable. After exposure to flame for 3 minutes the sample was self-extinguishing within 30 seconds.

The mixture of Example 206 increased in viscosity and became cream-like as had the mixtures of Examples 204 and 205. A slow exothermic reaction took place and the mixture cured to a hard, tough polymer. The sample cured at 120° F was subjected to the flame of a propane torch and emitted very low smoke and fine particles after 45 seconds exposure with a slight increase in smoke up to 1 minute 15 seconds. The smoke density decreased after 1 minute 15 seconds and only very light smoke could be observed after 1½ minutes. When the flame was removed after 3 minutes exposure, the sample was self-extinguishing in 7 seconds.

The mixture of Example 207 mixed and reacted similarly to that of Example 206. The sample cured to a hard, tough polymer and that polymer which had been held at 120° F was exposed to the flame of a propane torch and emitted very low smoke density up to 2 minutes 45 seconds when the smoke density increased slightly. When the flame was removed after 3 minutes, the polymer was self-extinguishing within 45 seconds.

An aluminum oxide filler supplied as a 325 mesh powder and sold under the trademark "T61" was used as a filler with the above-described resin sold under the trademark Epirez WD-510.

| Ex. | Epirez WD-510, gms. | T61 gms. | Tin Fluoborate 50% sol. | Copper Fluoborate 40% sol. | Pot Life 70° F | 10 gm. gel time 120° F |
|---|---|---|---|---|---|---|
| 208 | 50 | 50 | 3 | — | 7 min. | 5 min. |
| 209 | 50 | 50 | — | 3 | 2-3 hr. | 24 min. |

The mixture of Example 208 was very easy to blend and the viscosity decreased as the exothermic reaction took place. The sample cured at 120° F was subjected to an open flame of a propane torch and emitted light smoke and small particles after 30 seconds. Heavier smoke was emitted after 45 seconds. The test sample was removed from the flame after 3 minutes and continued to burn.

The mixture of Example 209 was also easy to blend and a slight exothermic reaction was observed. The mixture slowly cured to a hard, tough polymer. The sample held at 120° F was subjected to the flame of a propane torch and emitted light smoke and particles after 10 seconds exposure. The smoke density increased to a heavy smoke after 40 seconds and after the flame was removed at 3 minutes exposure time, it continued to burn.

A 50% solution of tin fluoborate in water was reacted with several polyalcohols and these reaction products were used as curing agents. Equal amounts by weight of the tin fluoborate 50% solution and glycerin were mixed resulting in an exothermic reaction during which the temperature increased from 70° to 85° F. When the mixture was cooled, a low viscosity liquid was obtained.

Similarly, equal weights of tin fluoborate 50% solution and triethylene glycol were mixed and an easily blended mixture obtained. An exothermic reaction took place and the temperature reached a maximum of 95° F and, when the mixture was cooled, a low viscosity liquid resulted.

The polyalcohol used was polypropylene glycol having an average molecular weight of 1200, is a liquid at room temperature and is sold under the trademark Dow P-1200. This polyalcohol was mixed with an equal weight of the tin fluoborate 40% aqueous solution. The mixture was easy to blend and an exothermic reaction occurred reaching a maximum temperature of 110° F and resulting in a low viscosity liquid material.

The above-described tin fluoborate-glycerin mixture is referred to in the two examples below as "Glycerin Mixture".

| Ex. | Epirez WD-510, gms. | "Glycerin Mixture" gms. | Pot Life at 70° F, min. | 5 gm. gel time at 120° F, min. |
|---|---|---|---|---|
| 210 | 100 | 4 | 9 | 6 |
| 211 | 100 | 8 | 7 | 5.5 |

The mixture of Example 210 was very easy to blend and the viscosity decreased until gellation occurred at 9 minutes at 70° F. After gellation, a very high exotherm took place. The samples held at 70° and 120° F cured to a hard, tough polymer with no discoloration.

The mixture of Example 211 was also very easy to blend and dropped in viscosity until gellation occurred. After gellation, the material foamed and looked like long chains had been formed. The samples held at 70 and 120° F both cured to hard, tough polymers with considerable discoloration.

The following two examples were run with the above-described tin fluoborate-triethylene glycol mixture which is referred to below as "triethylene glycol mixture".

| Ex. | Epirez WD-510, gms. | "Triethylene Glycol Mixture", gms. | Pot Life at 70° F, min. | 5 gm. gel time at 120° F, min. |
|---|---|---|---|---|
| 212 | 100 | 4 | 12 | 7 |
| 213 | 100 | 8 | 11 | 7 |

Both mixtures were very easy to blend and decreased in viscosity as the temperature increased from the exothermic reaction. The mixture of Example 212 turned cloudy at which time gellation occurred. After gellation, a very high exotherm took place and the mixture cured to a hard, tough polymer with no discoloration. The mixture of Example 213 was cloudy and creamy and after gellation, reacted with a high exotherm. The sample held at 70° F cured to a hard, tough polymer with complete discoloration. The sample held at 120° F also cured to a hard, tough polymer but with little discoloration.

The examples below used the above-described tin fluoborate solution Dow P-1200 mixture which is referred to below as "P-1200 mixture".

| Ex. | Epirez WD-510, gms. | "P-1200 Mixture" gms. | Pot Life at 70° F, min. | 5 gm. gel time at 120° F min. |
|---|---|---|---|---|
| 214 | 100 | 4 | 10 | 6 |
| 215 | 100 | 8 | 7 | 6 |

Both mixtures were very easy to blend and the viscosity decreased as the temperature increased as a result of the exotherm. In both examples an unexpected almost instantaneous gellation occurred followed by a very high exotherm. Samples held at 70° and 120° F cured to hard, tough polymers with no discoloration.

Mixtures of tin fluoborate 50% aqueous solution and 3 glycol ethers were made and these mixtures were used as curing agents. One hundred (100) grams of the tin fluoborate solution and tripropylene glycol methyl ether were thoroughly mixed. The mixture was easy to blend with an exothermic reaction taking place after about 30 seconds. The temperature increased from 70° F to 98° F and then cooled. A low viscosity liquid material resulted.

Similarly, 100 grams of the tin fluoborate solution and diethylene glycol butyl ether were mixed. The mixture was easy to blend and an exothermic reaction took place which reached 88° F and resulted in a low viscosity liquid material.

Lastly, 100 gram amounts of the tin fluoborate solution and propylene glycol methyl ether were mixed resulting in a visible reaction. A noticeable increase in temperature was observed after about 15 seconds when the temperature suddenly rose to 110° F. The reacton cooled about 5 minutes later and a low viscosity material was obtained.

The above-described tin fluoborate solution mixed with tripropylene glycol methyl ether will be referred to below as "tripropylene methyl ether mixture".

| Ex. | Epirez WD-510, gms. | "Tripropylene glycol methyl ether mix." gms. | Pot Life at 70° F, min. | 5 gm. gel time at 120° F, min. |
|---|---|---|---|---|
| 216 | 100 | 4 | 12 | 6 |
| 217 | 100 | 8 | 8 | 5 |

Both mixtures were very easy to blend and the viscosity dropped as the exothermic reaction increased the temperature of the mixture. In both examples, the temperature suddenly climbed to 110° F within a 3 to 5 second interval and reached a maximum of 132° F at which time gellation occurred. In both examples the gellation was followed by a very high exotherm where the temperature exceeded 250° F. The mixture of Example 216 cured to a hard, tough polymer from both 70° and 120° F. The mixture of Example 217 both at 70° and 120° F cured to hard, tough polymers with bad discoloration. A considerable amount of smoke was observed 45 seconds after gellation had occurred.

The following two examples were cured with the above-described tin fluoborate solution diethylene glycol butyl ether mixture which is referred to below as "diethylene glycol butyl ether mixture".

| Ex. | Epirez WD-510, gms. | "Diethylene Glycol Butyl Ether Mixture", gms. | Pot Life at 70° F, min. | 5 gm. gel time at 120° F, min. |
|---|---|---|---|---|
| 218 | 100 | 4 | 8 | 4 |
| 219 | 100 | 8 | 6 | 3 |

Both mixtures were very easy to blend and decreased in viscosity with increasing temperature. An unexpected and almost instantaneous gellation occurred in both mixtures. The gellation was followed by a very high exothermic reaction and the samples held both at 70° and 120° F cured to hard, tough polymers with some discoloration.

The following two examples were run with the abovedescribed mixture of tin fluoborate solution and propylene glycol methyl ether which will be referred to below as "propylene glycol methyl ether mixture".

| Ex. | Epirez WD-510, gms. | "Propylene Glycol Methyl Ether Mixture", gms. | Pot Life at 70° F, min. | 5 gm. gel time at 120° F, min. |
|---|---|---|---|---|
| 220 | 100 | 4 | 10 | 6 |
| 221 | 100 | 8 | 8 | 5 |

Both mixtures were very easy to blend with the viscosity dropping with increasing temperature. The mixture of Example 220 suddenly climbed to 110° F within 3 to 5 seconds and reached a temperature of 132° F at which time gellation occurred. This gellation was followed by a very high exotherm where the temperature exceeded 250° F. Both samples which had initially been at 70° and 120° F cured to hard, tough polymers with no discoloration.

The mixture of Example 221 increased very slowly to 150° F at which time gellation occurred. Gellation was followed by a rapid exothermic reaction where the temperature reached 300° F. The samples which had been initially at 70° and 120° F cured to hard, tough polymers with some discoloration.

The 50% aqueous solution of tin fluoborate was combined with a series of surfactants which are set forth in the table below and identified by the letters "K" through "Q".

The surfactants are identified in the table below by their trademarks for purposes of abbreviation and are more completely described as follows. A biodegradable, liquid, anhydrous, 100% active, nonionic surface active agent sold under the trademark Triton X-100 was used. It is a water-soluble iso-octyl phenoxy polyethoxy ethanol containing 10 moles of ethylene oxide.

The surfactant sold under the trademark Pluronic F-68 is described in U.S. Pat. No. 2,674,619 and is a 100% active nonionic surfactant having a dynamic foam height of greater than 600 mm at 120° F and 0.1% concentration, a carbon soil removal expressed as percent standard alkylaryl sulfonate at 140° F, 0.1% concentration of 120, a tagged clay soil removal on cotton expressed as percent standard soap at 140° F in distilled water at 0.25% concentration of 54 and a tagged clay soil removal of a formulation containing 20% Pluronic F-68, 50% STP, 20% soda ash and 10% SMS expressed as percent standard soap at 140° F in distilled water at 0.25% concentration of 120.

The surfactant sold under the trademark Triton N-101 is a biodegradable, liquid, anhydrous, nonionic surfactant. It is a water-soluble nonyl phenoxy polyethoxy ethanol containing 9-10 moles of ethylene oxide and is a 100% active material.

The surfactant sold under the trademark Triton X-102 is a biodegradable, liquid, anhydrous, water-soluble nonionic detergent. It is a 100% active octyl phenoxy polyethoxy ethanol containing 12-13 moles of ethylene oxide.

The surfactant sold under the trademark Triton X-114 is a 100% active, biodegradable, octyl phenoxy polyethoxy ethanol. It is a water-soluble liquid, nonionic surface active agent. The following table identified the curing agents which are referred to below by the letters "K" through "Q".

| Materials | K | L | M | N | P | Q |
|---|---|---|---|---|---|---|
| Tin Fluoborate 50% | 100 gms | 100 gms | 100 gms | 100 gms | 100 gms | 100 gms |
| Triton X-100 | 100 gms | | | | | |
| Pluronic F-68 | | 100 gms | 25 gms | | | |
| Triton N-101 | | | | 100 gms | | |
| Triton X-102 | | | | | 100 gms | |
| Triton X-114 | | | | | | 100 gms |

The mixture identified above as "K" reacted with an exotherm where the temperature reached 108° F. The cooled mixture was a low viscosity liquid.

The mixture identified above as "L" was blended in approximately 35 minutes and the temperature increased only slightly to 80° F from the original 70° F. The resulting mixture was a low viscosity liquid.

The mixture identified above as "M" blended in about 20 minutes and the temperature increased from the original 70° F to about 80° F. A low viscosity liquid resulted.

The mixture identified above as "N" as very easy to blend and the temperature increased from 70° to 112° F and, when cooled, formed a thixotropic paste.

The mixture identified above as "P" was easy to blend and increased in temperature from 70° to 111° F. The resulting mixture was a low viscosity liquid.

The mixture identified above as "Q" was easy to blend and the temperature increased from 70° to 106° F and resulted in a low viscosity liquid material.

The above-described mixtures were used as curing agents as shown in the following examples.

| Ex. | Epirez WD-510, gms. | "K" gms. | Pot Life at 70° F, min. | 5 gm. gel time at 120° F, min. |
|---|---|---|---|---|
| 222 | 100 | 4 | 13 | 8 |
| 223 | 100 | 8 | 9 | 6 |

The mixtures of Examples 222 and 223 were very easy to blend and decreased in viscosity as the temperature increased with the exothermic reaction. In both instances, an unexpected, almost instant gellation occurred followed by a very high exotherm. The mixtures of Example 222 cured to hard tough polymers with no discoloration both when initially held at 70° and 120° F. The mixtures of Example 223, when initially held at 70° and 120° F, both cured to hard, tough polymers with some discoloration.

| Ex. | Epirez WD-510, gms. | "L" gms. | Pot Life at 70° F, min. | 5 gm. gel time at 120° F, min. |
|---|---|---|---|---|
| 224 | 100 | 4 | 13.5 | 7 |
| 225 | 100 | 8 | 10.5 | 6 |

Both mixtures were very easy to blend and decreased in viscosity as the temperature increased with the exothermic reaction. An almost instant gellation occurred with both mixtures followed by a very high exotherm. Both samples of Example 224 which were initially at 70 and 120° F, cured to hard, tough polymers with no discoloration. The sample of Example 225 held at 70° F cured to a hard, tough polymer with considerable discoloration. The sample of Example 225 held at 120° F cured to a hard, tough polymer with little discoloration.

| Ex. | Epirez WD-510, gms. | "M" gms. | Pot Life at 70° F, min. | 5 gm. gel time at 120° F, min. |
|---|---|---|---|---|
| 226 | 100 | 4 | 8 | 7 |
| 227 | 100 | 8 | 4 | 3 |

Both mixtures were very easy to blend and decreased in viscosity with the exotherm. Both exhibited an unexpected instant gellation followed by a very high exotherm. Samples held initially at 70° and 120° F all cured to hard, tough polymers with no discoloration.

| Ex. | Epirez WD-510, gms. | "N" gms. | Pot Life at 70° F, min. | 5 gm. gel time at 120° F, min. |
|---|---|---|---|---|
| 228 | 100 | 4 | 10 | 7.5 |
| 229 | 100 | 8 | 8 | 6 |

Both examples were very easy to mix and decreased in viscosity with the exotherm. The mixture of Example 228 exhibited a very high exotherm after gellation and samples initially held at 70° and 120° F cured to hard, tough polymers with no discoloration. The mixtures of Example 229 increased in temperature during mixing until an unexpected almost instant gellation occurred followed by a high exotherm. The sample initially held at 70° F cured to a hard, tough polymer with moderate discoloration. The sample initially held at 120° F cured to a hard, tough polymer with complete discoloration and a considerable amount of smoke.

| Ex. | Epirez WD-510, gms. | "P" gms. | Pot Life at 70° F, min. | 5 gm. gel time at 120° F, min. |
|---|---|---|---|---|
| 230 | 100 | 4 | 10.5 | 7 |
| 231 | 100 | 8 | 8 | 5.5 |

Both examples were very easy to mix and decreased in viscosity with increasing temperature. The mixtures of Example 230 exhibited an almost instantaneous gellation followed by a very high exotherm. Both samples at 70° and 120° F cured to hard, tough polymers with no discoloration. The mixtures of Example 231 exhibited a very high exotherm after gellation. The sample initially at 70° F cured to a hard, tough polymer with little discoloration. The sample at 120° F cured to a hard, tough polymer with complete discoloration and a considerable amount of smoke.

| Ex. | Epirez WD-510, gms. | "Q" gms. | Pot Life at 70° F, min. | 5 gm. gel time at 120° F, min. |
|---|---|---|---|---|
| 232 | 100 | 4 | 11 | 6 |
| 233 | 100 | 8 | 5.5 | 4 |

Both mixtures were very easy to blend and decreased in viscosity with the exothermic reaction until gellation. As before, a very exothermic reaction took place after gellation. The mixtures of Examples 232 cured to hard, tough polymers with no discoloration and little smoke. The mixture of Example 233 which was initially at 70° F cured to a hard, tough polymer with some discoloration and a little smoke. The sample initially at 120° F cured to a hard, tough polymer with complete discoloration and a considerable amount of smoke.

The curing agents and mixtures and adducts containing same were used in an attempt to provide a series of epoxy foams. Although it is possible to obtain a foam without any additional foaming agent other than the water contained with the fluoborate salt solution, the foam density and foaming characteristics can be enhanced considerably by the use of conventional foaming agents such as fluorocarbons. The fluorocarbon trichlorofluoromethane sold under the trademark Freon-11 or "F-11" was used and is referred to herein as "F-11" for purposes of abbreviation. Additional chemical foams were made using aluminum powder and magnesium oxide in addition to "F-11". Foams having exceptional properties were obtainable using the curing agents of the present invention.

The following ingredients were mixed to form a resin useful in producing a polymeric foam:

TABLE II
"RESIN 16"

| Epirez WD-510 | 100 pbw |
| Glycerine | 0.55 pbw |
| RH-31F hydrated alumina | 100 pbw |
| "F-11" | 20 pbw |

| Ex. | "Resin 16" gms. | Tin Fluoborate 50% sol. gms. | Pot Life at 70° F, min. | Tack free time 70° F, min. | Approx. Foaming Ratio |
|---|---|---|---|---|---|
| 234 | 100 | 1 | 10 | 17 | 18:1 |
| 235 | 100 | 3 | 6 | 10 | 23:1 |
| 236 | 100 | 5 | 3 | 4 | 20:1 |
| 237 | 100 | 10 | 2 | 3 | 18:1 |

The mixture of Example 234 was very easy to blend and had a medium cream-like consistency which foamed very slowly with a very low pressure and delicate cell structure prior to curing. The cured foam had a small uniform closed cell structure and was hard and quite tough considering its expansion ratio. The cured foam was tested for 3 minutes by direct exposure to the flame of a propane torch. Light smoke was observed for the first 30 seconds followed by moderate smoke for the next 60 seconds. For the balance of the 3 minutes, very light smoke was observed. When the torch was removed, the foam was immediately self-extinguishing. There was no melting, running or deformation of the sample. The area covered by the flame was charred but not destroyed.

Both Examples 235 and 236 reacted in the same manner as did Example 234 and formed an excellent cured foam. The mixture of Example 237 was very easy to blend and had the same cream-like consistency as the above samples but was lower in viscosity. The foaming action was faster and the foam had a slightly higher foaming pressure. The cell structure was larger and less uniform and more open. The same burning results as above were noted except that the sample took 6 seconds to self-extinguish. Samples of the resin of Example 236 which had been stored for some time were used to run the following experiment. The expansion pressure of two different samples of the mixture of Example 236 was measured by placing 50 grams of the mixture to which the curing agent had just been added into a cylinder having an internal diameter of 2 ½ inches. A plunger was then placed in the cylinder and the force of expansion was measured and this force was divided by the area of the plunger. The amount of expansion which was permitted was varied. When the cylinder was unimpeded, the expansion ratio was 17.6:1 and the expansion pressure was, of course, zero. When the expansion ratio was kept to 10:1, the expansion pressure was 0.10 psi. When the expansion pressure was kept to 7.5:1 the expansion pressure was 0.37 psi. A different sample which had been stored in a glass vile was held to an expansion ratio of 10:1 and exhibited an expansion pressure of 2.08 psi. It is likely that the vile sample would be similar to freshly compounded material whereas the results for the above sample appear to indicate some loss of "F-11" on storage.

The following examples were compounded with the following ingredients which are referred to below as "Resin 17".

Table III
"RESIN 17"

| RH-31F hydrated alumina | 40 pbw |
| MD-2100 aluminum powder | 0.1 pbw |
| Magnesium Oxide, USP, heavy | 0.1 pbw |
| "F-11" | 2.5 pbw |
| Epirez WD-510 | 40 pbw |

| Ex. | "Resin 17" gms. | Tin Fluoborate 50% sol., gms. | Pot Life at 70° F, min. | Tack Free Time 70° F, min. | Approx. Foaming Ratio |
|---|---|---|---|---|---|
| 238 | 100 | 1 | 240 | 1260 | 1.5:1 |
| 239 | 100 | 3 | 4 | 8 | 7:1 |
| 240 | 100 | 5 | 2 | 3 | 8:1 |
| 241 | 100 | 10 | 1 | 1.5 | 9:1 |

The mixture of Example 238 was very easy to blend and formed a heavy creamy consistency which was very slow in curing and foamed only slightly. The mixture cured to a hard, very tough polymer and no flame test was run.

The mixture of Example 239 was also very easy to blend yielding a heavy creamy mixture which foamed slowly with very low pressure and a very delicate closed cell structure prior to curing. The cured foam had small, uniform, closed cells and was very hard and very tough. The cured foam was tested for 3 minutes by direct exposure to the flame of a propane torch. Light smoke was observed during the test and the foam was self-extinguishing within 2 seconds. No melting, running or deformation of the sample was observed during this test. The area which was impinged by the flame was charred but not destroyed. The mixture of Example 240 was essentially identical to that of 239.

The mixture of Example 241 was very easy to blend giving a creamy mixture which was lower in viscosity than that of Examples 239 and 240. The foaming reaction was rapid with higher pressure than the earlier two examples. The cured foam had small, uniform, closed cells with a very tough outer skin. When the sample was exposed to the flame of a propane torch for 3 minutes, only light gray smoke was observed with no after-burn. As above, there was no melting, running or deformation of the sample during the flame test. The area covered by the flame was charred with some loss of material but was not destroyed.

The above-described "F-11" containing resin referred to as "Resin 16" was cured with the same curing agent used for Examples 216 and 217 and is an equal weight mixture of a 40% aqueous solution of tin fluoborate and tripropylene glycol methyl ether. This mixture is referred to below as the "tripropylene glycol methyl ether mixture".

| Ex. | "Resin 16" gms. | "tripropylene glycol methyl ether mixture" | Pot Life at 70° F, min. | Tack Free Time at 70° F, min. | Approx. Foaming Ratio |
|---|---|---|---|---|---|
| 242 | 100 | 1 | 33 | 60 | 15:1 |
| 243 | 100 | 3 | 13 | 18 | 20:1 |
| 244 | 100 | 5 | 9 | 13 | 20:1 |
| 245 | 100 | 10 | 8 | 10 | 20:1 |

The mixture of Example 242 was very easy to blend and had a medium cream-like consistency which foamed slowly with low pressure and had a delicate cell structure prior to curing. The cured foam had small, uniform, closed cells and was hard and very tough. The cured foam was exposed to the flame of a propane torch for 3 minutes and moderate black smoke was observed after 10 seconds which gradually decreased and, after 30 seconds, only very light smoke was observed. The sample was self-extinguishing within 5 seconds. No melting, running or sample deformation was noted during this test and the area covered by the flame was charred and burned but not destroyed. The foam of Example 243 was the same as that of 242 except that it was immediately self-extinguishing.

The mixture of Example 244 was also easy to blend and had a medium cream-like consistency which foamed slowly with very low pressure and very delicate cell structure prior to curing. The cured foam had a larger, less uniform cell structure having cells which were more open and the cured foam evidenced some brittleness and was harder compared to the foam of Examples 242 or 243. The cured foam was exposed to the flame of a propane torch for 3 minutes and moderate black smoke was noted after 15 seconds which gradually decreased to a very light smoke after 90 seconds. The sample was self-extinguishing within 3 seconds and no melting, running or deformation took place. The area covered by the flame was charred and burned but was otherwise not destroyed. The foam of Example 245 reacted in the same manner as that of Example 244 except that the cured foam was brittle and was self-extinguishing after 8 seconds.

This same resin ("Resin 16") was cured with the mixture of a 50% tin fluoborate solution in water and the surfactant described above and sold under the trademark Pluronic F-68 which is referred to below as "Hardener M". This hardener contains 100 parts of the fluoborate solution to 25 parts by weight of the surfactant.

| Ex. | "Resin 16" gms. | "Hardener M", gms. | Pot Life at 70° F, min. | Tack Free Time at 70° F, min. | Approx. Foaming Ratio |
|---|---|---|---|---|---|
| 246 | 100 | 1 | 32 | 47 | 20:1 |
| 247 | 100 | 3 | 9 | 14 | 22:1 |
| 248 | 100 | 5 | 5 | 9 | 23:1 |
| 249 | 100 | 10 | 4 | 6 | 18:1 |

The mixture of Example 246 was very easy to blend and formed a cream-like mixture which foamed slowly with very low pressure and had a very delicate cell structure prior to curing. The cured foam had a small, uniform, closed cell structure and was extremely hard and tough. The cured foam was exposed to the flame of a propane torch for 3 minutes and heavy black smoke was observed after about 10 seconds which gradually decreased. After 50 seconds, only a light smoke was noted during the balance of the test. The sample was self-extinguishing within 6 seconds. No melting, running or deformation of the sample was observed during the test. The area covered by the flame was charred and burned but not destroyed.

The foam of Example 247 reacted in a manner similar to that of 246. When the cured foam was exposed to the direct flame of a propane torch, light smoke was observed for the first 45 seconds and very light smoke was noted for the balance of the test. The sample was immediately self-extinguishing and, as above, did not melt or deform during the test. The area covered by the flame was charred and burned but not destroyed. The foam of Example 248 reacted in the same manner as that of 247 and showed the same reaction to the flame test.

The mixture of Example 249 had a lower viscosity than the preceding three samples. If foamed faster but with a low pressure. The cured foam had larger less uniform cell structure which was more open. The cured foam was hard, with some resiliency. When exposed to the flame of a propane torch for 3 minutes, light smoke was observed but the foam was self-extinguishing after 40 seconds. As above, no melting, running, or sample destruction was noted during the test. The area covered by the flame was charred and more burning of the foam was noted than in the preceding samples.

The following foams were made using the above-described resin mixture referred to as "Resin 17". The curing agent used was identical with that used for the preceding four examples.

| Ex. | "Resin 17" gms. | "Hardener M", gms. | Pot Life at 70° F, min. | Tack Free Time at 70° F, min. | Approx. Foaming Ratio |
|---|---|---|---|---|---|
| 250 | 100 | 1 | 300 | 1260 | 1.5:1 |
| 251 | 100 | 3 | 23 | 40 | 7:1 |
| 252 | 100 | 5 | 6 | 11 | 8:1 |
| 253 | 100 | 10 | 2 | 5 | 8:1 |

The mixture of Example 250 was very easy to blend and formed a heavy cream which was very slow in curing and foamed only slightly. The mixture cured to a hard, very tough polymer. No flame test was run.

The mixture of Example 251 was also very easy to blend and formed a heavy, creamy consistency. This mixture foamed slowly with low pressure and with a very delicate cell structure prior to curing. The cured foam had a small, uniform cell structure and was very hard and tough. The cured foam was tested for 3 minutes by direct exposure to the flame of a propane torch. Light smoke was observed during the test and the foam was self-extinguishing within 8 seconds. There was no melting, running or deformation of the sample during the flame test. The area covered by the flame was charred but not destroyed.

The foam of Example 252 reacted in the same manner as that of Example 251 and was very similar in physical appearance. The cured foam was very tough and was self-extinguishing in 3 seconds when tested as above.

The mixture of Example 253 was very easy to blend and had a lower viscosity than the preceding three mixtures and had a creamy consistency. It foamed more rapidly than the preceding 3 mixtures but with a soft, delicate low pressure foaming action. The cured foam had small, uniform closed cells with very high strength. When this sample was tested for 3 minutes by direct exposure to the flame of a propane torch, only light smoke was observed with no after burn. No melting, running or deformation of the sample was noted during the test. The area covered by the flame was charred with some loss of material but was not destroyed.

The following examples were compounded with the ingredients shown in Table IV below and this mixture is referred to below as "Resin 18".

TABLE IV

| "RESIN 18" | | |
|---|---|---|
| Epirez WD-510 | 100 | pbw |
| Glycerine | 0.55 | pbw |
| Novosite L207a | 100 | pbw |
| "F-11" | 20 | pbw |

Novosite L207a is described above in the description of Example 199, and is a $SiO_2$ filler.

| Ex. | "Resin 18" gms. | Tin Fluoborate 50% sol.gms. | Pot Life at 70° F, min. | Tack Free Time at 70° F, min. | Approx. Foaming Ratio |
|---|---|---|---|---|---|
| 254 | 100 | 1 | 12 | 18 | 23:1 |
| 255 | 100 | 3 | 7 | 9 | 25:1 |
| 256 | 100 | 5 | 3 | 5 | 25:1 |

TABLE IV-continued

| "RESIN 18" | | |
|---|---|---|
| Epirez WD-510 | 100 | pbw |
| Glycerine | 0.55 | pbw |
| Novosite L207a | 100 | pbw |
| "F-11" | 20 | pbw |
| Novosite L207a is described above in the description of Example 199, and is a SiO₂ filler. | | |

| Ex. | "Resin 18" gms. | Tin Fluoborate 50% sol.gms. | Pot Life at 70° F, min. | Tack Free Time at 70° F, min. | Approx. Foaming Ratio |
|---|---|---|---|---|---|
| 257 | 100 | 10 | 1.75 | 2.75 | 21:1 |

The mixtures of Examples 254 through 256 were very easy to blend and had a light cream-like consistency which foamed very slowly with very low pressure and with a very delicate cell structure prior to curing. The cured foam had small uniform closed cells and was hard and somewhat brittle. The cured foam was exposed to the flame of a propane torch for 3 minutes and moderabe black smoke started within 15 seconds and gradually decreased with almost no smoke after 2½ minutes. The sample of Example 254 was almost immediately self-extinguishing and the samples of Examples 255 and 256 were self-extinguishing after 8 seconds. None of the samples showed any melting, running or deformation but the area touched by the flame was charred and burned but was not destroyed.

The mixture of Example 257 was also very easy to blend and foamed rapidly but with low pressure. The cured foam had larger, less uniform, more open cells than the foam of Examples 254–256. The cured foam was exposed to the flame of a propane torch for 3 minutes and light black smoke was observed during the test. The sample was self-extinguishing within 25 seconds and did not melt or deform. The area exposed to the open flame was charred but not destroyed.

The following examples were compounded using the resin listed below which is referred to as "Resin 19".

TABLE V

| "RESIN 19" | | |
|---|---|---|
| Epirez WD-510 | 100 | pbw |
| Glycerine | 0.55 | pbw |
| Barytes Foam A White | 100 | pbw |
| "F-11" | 20 | pbw |

Barytes Foam A is an essentially pure barium sulfate, 325 mesh, white in color and is manufactured by the DeLou Division of National Lead Co.

| Ex. | "Resin 19" gms | Tin Fluoborate 50% sol. gms. | Pot Life at 70° F, min. | Tack Free Time at 70° F, min. | Approx. Foaming Ratio |
|---|---|---|---|---|---|
| 258 | 100 | 1 | 10 | 13 | 25:1 |
| 259 | 100 | 3 | 4 | 6 | 20:1 |
| 260 | 100 | 5 | 3 | 5 | 20:1 |
| 261 | 100 | 10 | 1.33 | 2 | 20:1 |

The mixture of Example 258 was easy to blend and had a very low viscosity. The sample foamed slowly with very low pressure and had a very delicate cell prior to curing. The cured foam had small uniform closed cells and was surprisingly hard and tough considering the low density of the foam. The foam was exposed to the flame of a propane torch for 3 minutes and emitted a moderate amount of black smoke but was immediately self-extinguishing. It did not melt, drip or distort and the area exposed to the flame was charred and burned but not consumed.

The mixtures of Examples 259 through 261 were also easy to blend and had a very low viscosity. They foamed at a uniform rate with low pressure and cured to foams having small uniform closed cells. The foams were not as hard as that of Example 258. The flame test described for Example 258 was repeated with identical results for all three examples except that the Example 260 was self-extinguishing in 5 seconds and that of 261 in 55 seconds. Also, the cell structure of Example 261 was larger, less uniform, and more open than that of the other examples.

While this invention has been described and exemplified in terms of its preferred modifications, those skilled in the art will appreciate that modifications can be made without departing from the spirit and scope of the invention.

I claim:

1. An autocatalytic process for curing an epoxy resin composition at room temperature without the use of a strong acid or the hydrolyzable ester thereof, said process comprising:

mixing at room temperature an epoxy resin made from epichlorohydrin and a dihydric phenol with at least ½ part of an aqueous solution of a metalic fluoborate salt per 100 parts of resin said composition being free from a strong acid or the hydrolyzable ester thereof; and maintaining the resulting mixture free from external heat.

2. The process of claim 1 wherein said metallic fluoborate salt is selected from the group consisting of tin, copper, zinc, nickel, lead and silver.

3. The process of claim 1 wherein said aqueous solution contains between about 40 and 50 percent by weight of said fluoborate salt.

4. An autocatalytic process for curing an epoxy resin composition at room temperature without the use of a strong acid or the hydrolyzable ester thereof, said process comprising:

mixing at room temperature an epoxy resin made from epichlorohydrin and a dihydric phenol with at least ½ part per 100 parts of resin of tin fluoborate in aqueous solution, said composition being free from a strong acid or the hydrolyzable ester thereof; and maintaining the resulting mixture free from external heat.

5. The process of claim 4 wherein said dihydric phenol is bisphenol A, said resin has an epoxide equivalent between 185 and 200, and said tin fluoborate is between ½ and 3 parts per 100 parts of resin.

6. The process of claim 5 wherein said tin fluoborate is present at a level of about 1 part per 100 parts of resin.

7. The process of claim 4 wherein said dihydric phenol is bisphenol A, said resin has an epoxide equivalent between about 300 and 325 and said tin fluoborate is present at a level of about ½ part per 100 parts of resin.

8. The process of claim 4 wherein said dihydric phenol is bisphenol A, said resin has a surfactant added thereto and an epoxide equivalent of about 200 and said tin fluoborate is present at a level of between ½ and 62 parts per 100 parts of resin.

9. The process of claim 4 wherein said epoxy resin is modified with butyl glycidyl ether having an epoxide equivalent between about 180 and 195 and said tin fluoborate is between ½ and 25 parts per 100 parts of resin.

10. The process of claim 9 wherein said tin fluoborate is between ½ and 1 part per 100 parts of resin.

11. An autocatalytic process for curing an epoxy resin composition at room temperature without the use of a strong acid or the hydrolyzable ester thereof, said process comprising:

mixing at room temperature an epoxy resin made from epichlorohydrin and a dihydric phenol with at least ½ part per 100 parts of resin of copper fluoborate in aqueous solution, said composition being free from a strong acid or the hydrolyzable ester thereof; and maintaining the resulting mixture free from external heat.

12. The process of claim 11 wherein said dihydric phenol is bisphenol A, said resin has an epoxide equivalent between about 185 and 200 and said copper fluoborate is present between ½ and 25 parts per 100 parts of resin.

13. The process of claim 11 wherein said dihydric phenol is bisphenol A, said resin has an epoxide equivalent between about 300 and 325 and said copper fluoborate is present between ½ and 1 part per 100 parts of resin.

14. The process of claim 11 wherein said dihydric phenol is bisphenol A, and has an epoxide equivalent between about 185 and 200 and said copper fluoborate is between about 0.4 and 20 parts per 100 parts of resin.

15. The process of claim 11 wherein said epoxy resin is a bisphenol A epichlorophydrin diepoxide resin modified with butyl glycidyl ether having an epoxide equivalent between 180 and 195 and said copper fluoborate is between about 0.4 and 20 parts per 100 parts of resin.

16. An autocatalytic process for curing an epoxy resin composition at room temperature without the use of a strong acid or the hydrolyzable ester thereof, said process comprising:

mixing at room temperature an epoxy resin made from epichlorohydrin and a dihydric phenol with at least ½ part per 100 parts of resin of zinc fluoborate in aqueous solution, said composition being free from a strong acid or the hydrolyzable ester thereof; and maintaining the resulting mixture free from external heat.

17. The process of claim 16 wherein said dihydric phenol is bisphenol A, and has an epoxide equivalent between about 185 and 200 and said zinc fluoborate is between about 0.4 and 12 parts per 100 parts of resin.

18. The process of claim 16 wherein said dihydric phenol is bisphenol A, said resin has a surfactant added thereto and has an epoxide equivalent of about 200 and said zinc fluoborate is present at a level between about 0.4 and 2.4 parts per 100 parts of resin.

19. An autocatalytic process for curing an epoxy resin composition at room temperature without the use of a strong acid or the hydrolyzable ester thereof, said process comprising:

mixing at room temperature an epoxy resin made from epichlorohydrin and a dihydric phenol with at least ½ part per 100 parts of resin of nickel fluoborate in aqueous solution, said composition being free from a strong acid or the hydrolyzable ester thereof; and maintaining the resulting mixture free from external heat.

20. The process of claim 19 wherein said dihydric phenol is bisphenol A, and has an epoxide equivalent between about 185 and 200 and said nickel fluoborate is between about ½ and 7 parts per 100 parts of resin.

21. The process of claim 19 wherein said dihydric phenol is bisphenol A, said resin has a surfactant added thereto and has an epoxide equivalent of about 200 and said nickel fluoborate is present at a level between about ½ and 15 parts per 100 parts of resin.

22. The process of claim 19 wherein said epoxy resin is a bisphenol A epichlorohydrin diepoxide resin modified with butyl glycidyl ether having an epoxide equivalent between about 180 and 195 and said nickel fluoborate is between about ½ and 3 parts per 100 parts of resin.

23. An autocatalytic process for curing an epoxy resin composition at room temperature without the use of a strong acid or the hydrolyzable ester thereof, said process comprising:

mixing at room temperature an epoxy resin made from epichlorohydrin and a dihydric phenol with at least ½ part per 100 parts of resin of lead fluoborate in aqueous solution, said composition being free from a strong acid or the hydrolyzable ester thereof; and maintaining the resulting mixture free from external heat.

24. The process of claim 23 wherein said dihydric phenol is bisphenol A, said resin has a surfactant added thereto and has an expoxide equivalent of about 200 and said lead fluoborate is present at a level between about ½ and 3 parts per 100 parts of resin.

25. An autocatalytic process for curing an epoxy resin composition at room temperature without the use of a strong acid or the hydrolyzable ester thereof, said process comprising:

mixing at room temperature an epoxy resin made from epichlorohydrin and a dihydric phenol with a catalyst consisting essentially of an aqueous mixture of a metallic fluoborate salt and a surfactant; and maintaining the resulting mixture free from external heat.

* * * * *